US012769940B2

(12) United States Patent
Petruk et al.

(10) Patent No.: US 12,769,940 B2
(45) Date of Patent: Oct. 20, 2026

(54) AUTOMATIC SUGGESTION OF DOMAIN-SPECIFIC KNOWLEDGE

(71) Applicant: Grammarly, Inc., San Francisco, CA (US)

(72) Inventors: Anna Petruk, Cherkasy (UA); Kashish Hora, New York, NY (US)

(73) Assignee: Superhuman Platform Inc.

( * ) Notice: Subject to any disclaimer, the term of this patent is extended or adjusted under 35 U.S.C. 154(b) by 192 days.

(21) Appl. No.: 18/677,261

(22) Filed: May 29, 2024

(65) Prior Publication Data

US 2024/0403558 A1 Dec. 5, 2024

Related U.S. Application Data

(60) Provisional application No. 63/505,113, filed on May 31, 2023.

(51) Int. Cl.
*G06F 40/253* (2020.01)
*G06F 40/186* (2020.01)
(Continued)

(52) U.S. Cl.
CPC .......... *G06F 40/253* (2020.01); *G06F 40/186* (2020.01); *G06F 40/232* (2020.01); *G06F 40/237* (2020.01); *G06Q 10/101* (2013.01)

(58) Field of Classification Search
CPC .... G06F 40/253; G06F 40/186; G06F 40/232; G06F 40/237; G06F 40/30; G06F 40/56; G06Q 10/101
See application file for complete search history.

(56) References Cited

U.S. PATENT DOCUMENTS 11,227,119 B2 * 1/2022 Saha .................... G06F 40/247
11,561,964 B2 * 1/2023 Botea ...................... G10L 15/22
(Continued)

FOREIGN PATENT DOCUMENTS

EP 3757729 A1 12/2020
WO 2022132167 A1 6/2022

OTHER PUBLICATIONS

Anonymous, International Search Report and Written Opinion, Application No. PCT/US2024/031432, mailed Sep. 9, 2024, 11 pages, pub. by the Korean Intellectual Property Office, Seo-gu, Daejeon, Republic of Korea.

*Primary Examiner* — Abul K Azad
(74) *Attorney, Agent, or Firm* — Van Hoven PC; Jordan Becker

(57) ABSTRACT

In one embodiment, a method may receive, from a client device, a text input from a user. The text input can comprise a plurality of words. The method can access, from a server computer, common knowledge associated with a data store. The method can generate, using a generative artificial intelligence model, contextual features in a query associated with the text input. The generative artificial intelligence model has been trained to generate the contextual features in the query based on the common knowledge associated with the data store. The method can generate, using the generative artificial intelligence model, a text output using the contextual features in the query associated with the text input. The method can send, to the client device, instructions for presenting a user interface comprising the text output.

15 Claims, 18 Drawing Sheets

(51) Int. Cl.

| | |
|---|---|
| ***G06F 40/232*** | (2020.01) |
| ***G06F 40/237*** | (2020.01) |
| ***G06Q 10/101*** | (2023.01) |

(56) References Cited

U.S. PATENT DOCUMENTS

| | | | | |
|---|---|---|---|---|
| 11,960,848 | B2 * | 4/2024 | Shazeer | G06F 40/284 |
| 2020/0201898 | A1 | 6/2020 | Esponda | |
| 2021/0294812 | A1 | 9/2021 | Silk et al. | |
| 2022/0382977 | A1 | 12/2022 | Parrish et al. | |
| 2024/0291853 | A1 * | 8/2024 | Murphy | G06N 3/0475 |
| 2024/0296275 | A1 * | 9/2024 | Whitmore | G06F 40/166 |
| 2024/0296295 | A1 * | 9/2024 | Russell | G06F 40/44 |

* cited by examiner

AUTOMATIC SUGGESTION OF DOMAIN-SPECIFIC KNOWLEDGE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. @ 2022-2023 Grammarly, Inc.

BENEFIT CLAIM

This application claims the benefit under 35 U.S.C. § 119(e) of provisional application 63/505,113, filed May 31, 2023, the entire contents of which are hereby incorporated by reference for all purposes as if fully set forth herein.

TECHNICAL FIELD

One technical field of the present disclosure is computer-implemented natural language processing applied to reading and text processing tasks. Another technical field is enterprise artificial intelligence (AI) powered communication applications including large language models (LLMs) applied to domain-specific knowledge. Another technical field is computer-based enterprise knowledge management.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

Groups, organizations, and enterprises commonly develop domain-specific vocabularies of terms, acronyms, industry-specific jargon, project names, or other terms that have meaning only within a particular enterprise or organization (any of which can be denoted a "term" for simplicity). When a person joins a project, group, organization, or enterprise with a long-established, extensive, complex domain-specific vocabulary, the person can encounter a delay, inefficiency, or difficulty in discovering the meaning of the term. For example, the person may have to use internet searches, emails to colleagues, phone calls, or other inefficient means to locate the meaning of terms and related resources such as documents, web pages, or people. These issues reduce the productivity of persons who are new to a project, group, organization, or enterprise. The same issues can arise for people who are not new but unfamiliar with the relevant term or who have not used the term in a long interval.

Based on the foregoing, the referenced technical fields have developed an acute need for better ways to provide efficient, convenient means of delivering definitions and relevant resources and people based on identifying a term in a digital electronic document.

SUMMARY

The appended claims may serve as a summary of the invention.

DETAILED DESCRIPTION

1. General Overview

Figure 1:
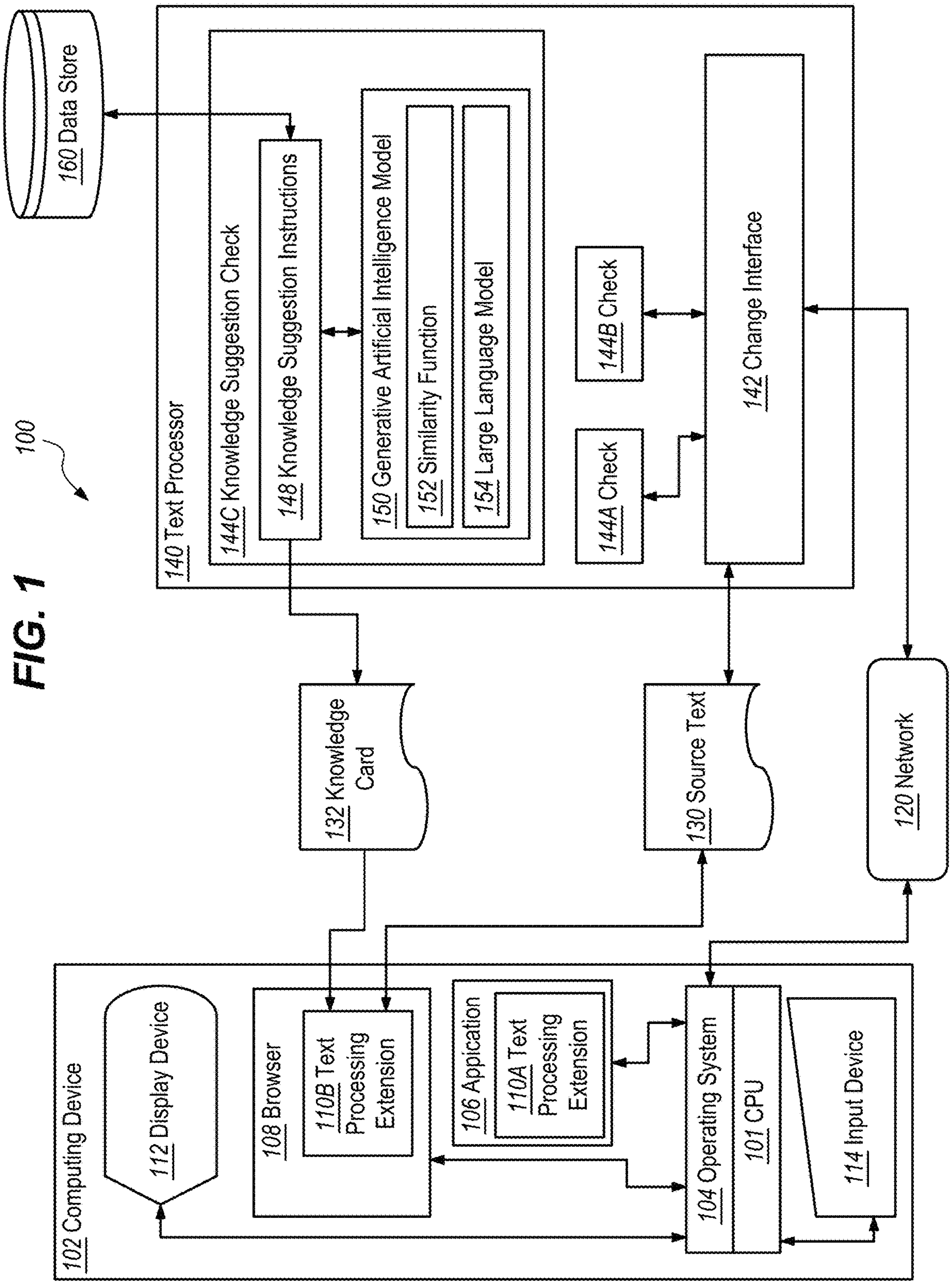
FIG. 1 illustrates a distributed computer system showing the context of use and principal functional elements with which one embodiment could be implemented.

In the following description, to illustrate clear examples, numerous specific details are outlined to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described concerning one or more particular embodiments or drawing figures, but such features are not limited to usage in the one or more particular embodiments or figures concerning which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

2. Structural & Functional Overview

In one embodiment, a computer-implemented method is programmed to identify terms in digital electronic documents, retrieve definitions, related resources, and information about related people that are relevant to the term, and visually display the definitions, related resources, and information about related people that are relevant to the term within the same user interface as an application in which the term appears in the document. Example applications include email, instant messaging, collaborative online document editing systems, word processing applications, spreadsheets, and other personal or enterprise productivity applications.

2.1 Distributed Computer System Example

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of automatically domain-specific knowledge, definitions, links to people, or links to resources relevant to a text to a computing device in association with a writing or text preparation application. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, computing device 102 is communicatively coupled via a network 120 to a text processor 140. In one embodiment, computing device 102 comprises a personal computer, laptop computer, tablet computer, smartphone, or notebook computer configured as a client of the text processor 140. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on a computing device 102.

At runtime, one or more of application 106 and browser 108 loads, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or obtaining input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the computing device of a user.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a computing device can provide free-form text describing a product or service. The text processing extension 110B is programmed to detect a selection of the text entry panel, the entry of text, or changes in the text within the panel via input from or using the computing device 102 and to transmit all such text changes to text processor 140. In an embodiment, each text processing extension 110A, 110B is programmed to buffer or accumulate text changes locally over a programmable period, for example, five seconds, and to transmit the accumulated changes over that period as a batch-to-text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc.

Network 120 broadly represents one or more local area networks, wide area networks, campus networks, or internetworks in any combination, using any form of links from among terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private data center, public data center, and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140, such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute on a first computer, and text processing extensions 110A, 110B may execute on a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more documents that computing device 102 is viewing or reading via extensions 110A, 110B, and/or text changes that text processing extension 110B transmits to change interface 142. In an embodiment, change interface 142 is programmed to distribute every sentence or paragraph of a document that is being read and/or text change arriving from a text processing extension 110A, 110B to all of the checks 144A, 144B, 144C, which execute in parallel and/or in independent threads. In various embodiments, source text 130 can be obtained from an e-mail application like GMAIL, an instant messaging application like SLACK, a web page that the browser 108 has accessed and rendered, or other applications.

Thus, in one embodiment, the text processor 140 may be programmed to programmatically receive a digital electronic object comprising a text input, such as a source text, a message with the source text, an application protocol message with the source text, an HTTP POST request with the source text as a payload, or using other programmed mechanics. The text input can comprise a plurality of words. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with a browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a knowledge suggestion check, and therefore it is also denoted "knowledge suggestion check 144" in this description.

In an embodiment, knowledge suggestion check 144C comprises knowledge suggestion instructions 148, which interoperate with a generative artificial intelligence model 150 and a data store 160. The data store 160 can be implemented as a digital knowledge store, center, or hub, partially in main memory, using technologies such as Redis, and in long-term storage technologies in non-volatile storage devices such as cloud-based disk storage. "Knowledge hub," in this context, refers to a programmed service that is capable of receiving requests for access, queries, or calls from other applications, programs, services, or systems, using programmatic techniques such as API calls, RPC calls, methods, or functions, to request or return definitions of terms, identifications of users, computing devices, or user accounts, and other enterprise knowledge, as further described in other sections herein. The data store 160 can be integrated with text processor 140 or implemented as separate storage. In an embodiment, data store 160 comprises a database, flat file system, object store, or another digital data repository. The data store 160 can be configured using a table schema or other data storage schema to store a large number of records, each record comprising at least one or more hash values of text units, in association with user, computing device, or account identifiers. The structure and use of such records are described further in other sections herein.

The text processor 140 can be implemented to access, from a server computer, common knowledge associated with the knowledge hub of the data store 160. The text processor 140 can use the generative artificial intelligence model 150 to build an on-demand contextually aware machine learning model that automatically adapts contextual features in a query to the user text input to ensure the user's goal and effective communication. In particular, the text processor 140 can use the generative artificial intelligence model 150 to generate a plurality of parameters associated with the text input by finding relevant information from the knowledge hub of the data store 160. The plurality of parameters associated with the text input can be used to determine unique contextual features in a query that characterizes the text input. For example, the contextual features in the query can be optimized based on the optimal realization of user goals and user experience. In particular, the generative artificial intelligence model 150 can be trained to generate the plurality of parameters associated with the text input based on the common knowledge represented in the knowledge hub, which can be personalized to understand personal and organizational context, writing style, and goals. As a result, the generative artificial intelligence model 150 can be used to determine the contextual features in the query with high-quality data security, user privacy, and model responsibility.

Furthermore, the text processor 140 can use a large language model 154 to determine a text output using the contextual features in the query associated with the text input. Thus, the text processor 140 can send, to the client device, such as computing device 102, instructions for presenting a user interface, such as display device 112, comprising the text output. As a result, the text processor 140 can leverage the generative artificial intelligence model 150 to help solve various real problems.

In an embodiment, the text processor 140 can be programmed to apply the generative artificial intelligence model 150 to add context for one or more terms in the knowledge hub of the data store 160. One or more terms in the knowledge hub can be used to reference an internal project name or describe a new one from an external source. For example, the text processor 140 can manually add one or more terms to the knowledge hub. As another example, the text processor 140 can use the generative artificial intelligence model 150 based on in-line suggestions and/or presets to add one or more terms to the knowledge hub. The text processor 140 can feed the detected one or more terms as the context in the query to the large language model 154 to fetch information associated with text input in a prompt from a user or computing device 102. The text processor 140 can automatically incorporate the contextual features of the query on a plurality of terms used in company terminology from the knowledge hub when composing a piece of writing or a quick reply. Furthermore, the text processor 140 can apply the generative artificial intelligence model 150 to quickly incorporate context from the relevant term in the knowledge hub while rewriting a text.

In an embodiment, the text processor 140 can be programmed to apply the generative artificial intelligence model 150 to adjust tone based on a user's brand tone setting stored in the knowledge hub stored in the data store 160. In particular, the user can select the brand tone setting from a plurality of tone profiles in the knowledge hub, such as joyful, excited, admiring, loving, cautious, surprised, cautionary, etc. When the user rewrites a text, the user can select the brand tone setting in a "Sound more on-brand" section in a user interface. For example, the "Sound more on-brand" section can display a list of on-brand tones that can quickly be applied to the user's writing. In addition, the user can activate an "Adjust tone to be on-brand" action to automatically rewrite the user's writing more on-brand based on a particular tone setting selected by the user.

In an embodiment, the text processor 140 can be programmed to apply the generative artificial intelligence model 150 to generate one or more templates relevant to a user's goal. In particular, the text processor 140 can use a starting document, such as a website or an application, to quickly create sales emails, marketing announcements, and recruiting outreach emails. For example, the text processor 140 can apply the generative artificial intelligence model 150 to detect a document type based on the starting document. As another example, the text processor 140 can apply the generative artificial intelligence model 150 to determine suggestions for rewriting the starting document to improve the specific document based on best practices.

In an embodiment, the text processor 140 can be programmed to pool prompt usage limits across an entire organization. The text processor 140 can automatically collect prompt usage limits for multiple users as in a team and allow the team members to share from a pooled prompt limit across the entire organization rather than having individual prompt limits. Thus, the text processor 140 can allow the first user in the team to take full advantage of the computing capability of the generative artificial intelligence model 150. Furthermore, the text processor 140 can also grant permission to a second user to use the generative artificial intelligence model 150 based on one or more metrics associated with the second user's goal, such as urgency, priority, time, complexity, etc. As a result, the text processor 140 can optimize its ability to configure the organization's prompt pooling settings to control who has access and how many prompts users are allotted for some time, such as a day, a week, a month, or a year.

In an embodiment, the text processor 140 can be programmed to analyze the prompt usage and display one or more feature usages metrics, such as the number of dismiss actions, number of users, or number of communications, on a dashboard for making recommendations to a manager on how to use the generative artificial intelligence model 150. The text processor 140 can use one or more feature usage metrics to monitor the usage of the generative artificial intelligence model 150 for multiple users. For example, the text processor 140 can determine that the generative artificial intelligence model 150 gains good feedback from the users if the number of users is increasing with time. As another example, the text processor 140 can determine that the generative artificial intelligence model 150 gains bad feedback from a user if the number of communication for the user decreases with time.

In an embodiment, the text processor 140 can be programmed to execute an inference stage of the large language model 154 over the source text 130, and context data, to output suggestions to rewrite or rephrase the source text to improve clarity, conciseness, tone, or other linguistic dimensions. The large language model 154 can be a multi-class neural network. The source text 130 can be a prompt to the LLM, and the context data can comprise acronyms, project names, or other enterprise-specific terminology extracted from the source text. In an embodiment, the text processor 140 can use the generative artificial intelligence model 150 to generate the context associated with the text input by finding relevant information from the knowledge hub of the data store 160.

The text processor 140 can comprise a set of stored program instructions that implement a similarity function 152, which can be configured as a scheduled job to periodically read and transform or use data in data store 160. The text processor 140 can apply the similarity function to map a plurality of parameters in the source text 130 to pre-configured contextual features, to produce context for the source text to submit to the LLM. Thus, the text processor 140 could be programmed to submit the source text 130 to the LLM as a query and to submit unique features extracted from the source text as added context. In some embodiments, the text processor 140 can use the output from the large language model 154 to rewrite the input text in one or more dimensions, such as grammatic error correction (GEC), clarity, tone, simplification, etc.

Furthermore, the text processor 140 can be programmed to use the multi-class neural network to modify the text output in a plurality of attributes. The plurality of attributes can be determined based on the user's intent. In particular, the plurality of attributes can comprise two or more of correctness, clarity, length, simplification, diversity, sensitivity, and tone. For example, the text processor 140 can use the multi-class neural network to generate one or more text suggestions comprising all of a grammatic error correction to correct a grammatic error in the text input. As another example, the text processor 140 can use the multi-class neural network to modify the text input by merging or splitting one or more words in the text input. As another example, the text processor 140 can use the multi-class neural network to modify the text input by expanding or compressing one or more words in the text input. As another example, the text processor 140 can use the multi-class neural network to modify the text input by simplifying or complexifying one or more words in the text input. As another example, the text processor 140 can use the multi-class neural network to modify the text input by paraphrasing one or more words in the text input. As another example, the text processor 140 can use the multi-class neural network to modify the text input by de-toxifying one or more words in the text input. As another example, the text processor 140 can use the multi-class neural network to modify the text input by using formal or informal terms for one or more words in the text input.

In an embodiment, phrase suggestion instructions 148 are programmed, in part, to output a knowledge card 132 to transmit to text processing extension 110B. The knowledge card 132 comprises one or more suggestions of definitions of terms, acronyms, industry-specific jargon, project names, or other terms that have meaning only within a particular enterprise or organization, and other elements, links to descriptions of relevant people in an enterprise such as those working on a related project, links to networked resources such as documents, websites, videos, or recordings, or other data relevant to the detected term or acronym in the source text 130. The knowledge card 132 represents one example of an output in which the suggestions described above can be presented visually using a graphical user interface in browser 108 or application 106. In other embodiments, knowledge card 132 can represent a programmatic response, a data structure, or a structured package of data, such as a JSON blob, that is transferred to the application 106 or browser 108 for local interpretation and presentation.

Knowledge cards 132 and items in the data store 160 can have a variety of different supported types; the documents forming this specification identify example types, but any identification of types is not exhaustive, and embodiments are not limited to the specific types that are stated. Other labels, categories, and kinds of items can be supported and shown in knowledge cards 132.

Figure 2:
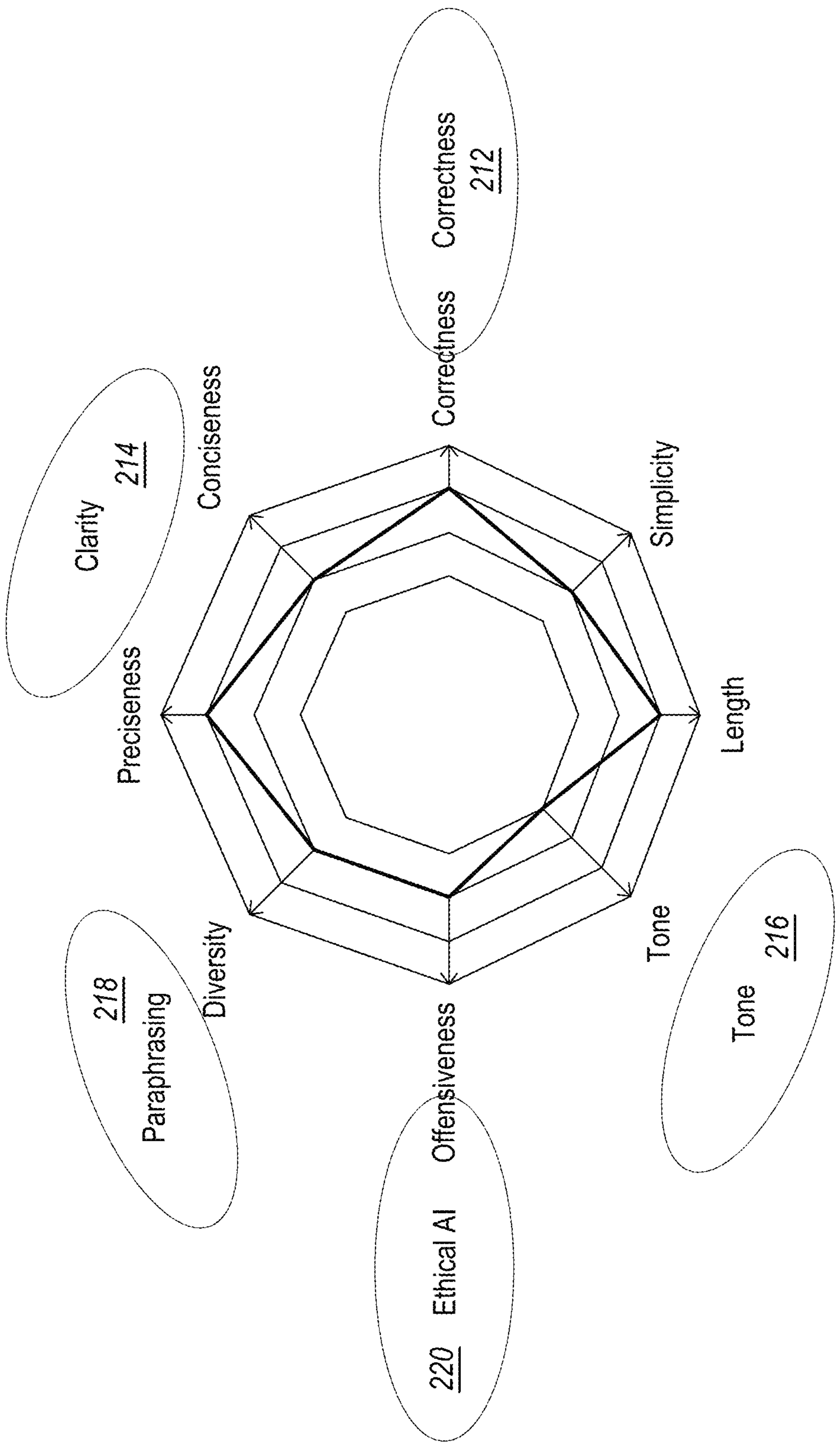
FIG. 2 illustrates an example web diagram showing one arrangement of the different dimensions.

FIG. 2 illustrates an example web diagram showing one arrangement of the different dimensions of suggestions for changes to a text. The text processor 140 can determine a plurality of attributes associated with the suggestions organized into different linguistic dimensions, such as correctness 212, clarity 214, paraphrasing 218, ethical AI 220, and tone 216. Each of the dimensions can include one or more subdimensions. For example, the clarity dimension 214 can include conciseness, simplicity, length, and preciseness. The paraphrasing dimension 218 can include diversity. The ethical AI dimension 220 can include offensiveness. For each dimension or subdimension, the text processor 140 can determine a respective attribute for the corresponding dimension or subdimension to assess separate suggestions for each dimension or subdimension. A value of the respective attribute for the corresponding dimension or subdimension is indicative of the improvement that is needed to improve the text input along the corresponding dimension or subdimension. For example, a value of 0.67 for correctness, preciseness, and length can suggest the text processor 140 determines that the text input has a good quality of correctness, preciseness, and length. As another example, a value of 0 for tone can suggest that the text processor 140 determines that the text input has a bad quality for tone for improvement.

In an embodiment, the text processor 140 can determine a first rewrite plot for a plurality of linguistic dimensions before applying the text suggestions for the plurality of words of the text sequence input. Likewise, the text processor 140 can determine a second rewrite plot for the plurality of linguistic dimensions after applying the text suggestions for the plurality of words of the text sequence input. Therefore, the text processor 140 can determine a rewrite improvement by comparing the first rewrite plot to the second rewrite plot. In response to determining whether the rewrite improvement is above a predetermined threshold, the text processor 140 can accept the text suggestions for the plurality of words of the text sequence input. In response to determining whether the rewrite improvement is below the predetermined threshold, the text processor 140 can reject the text suggestions for the plurality of words of the text sequence input.

2.2 Example Data Processing Flows

Figure 3:
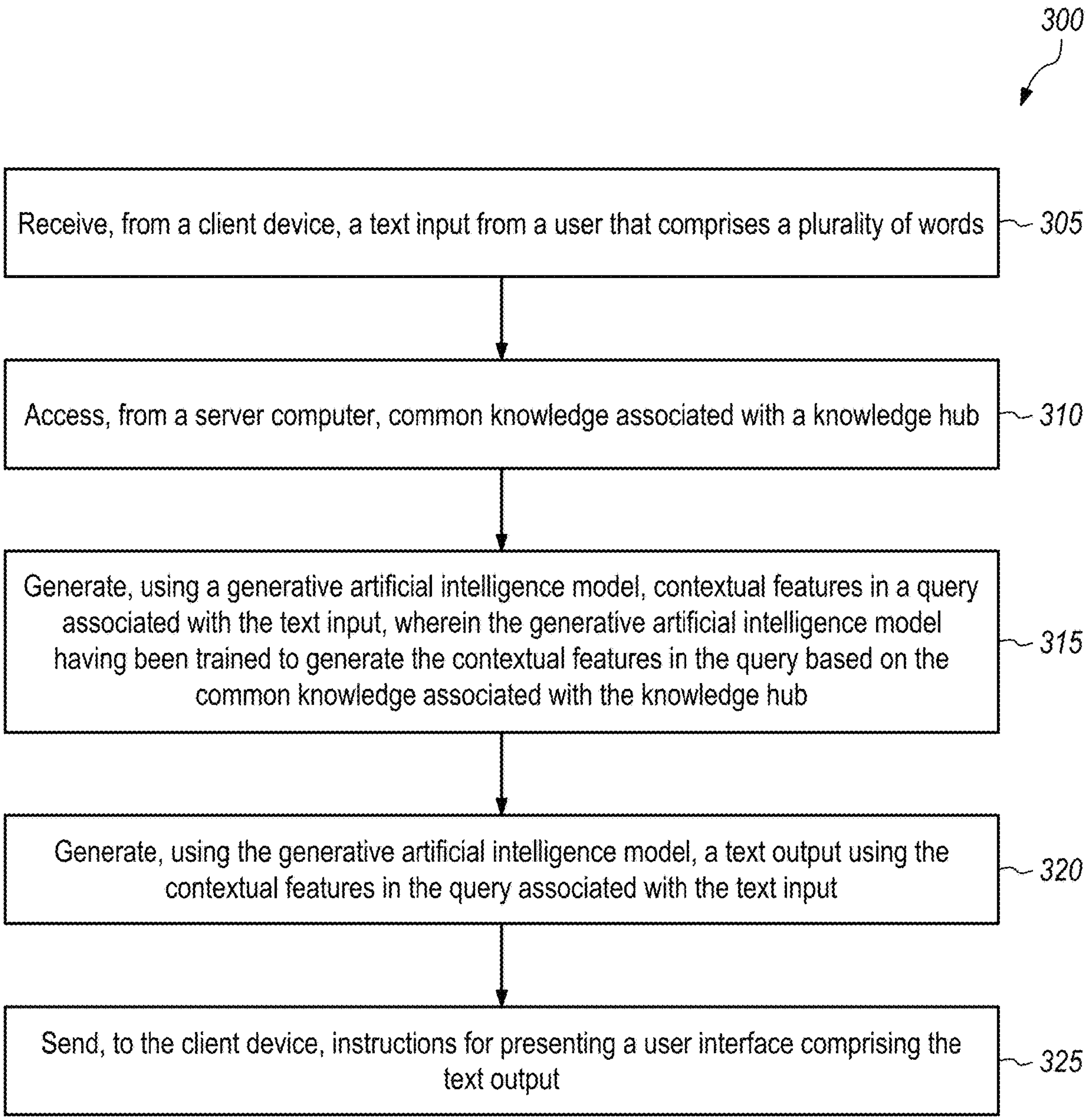
FIG. 3 illustrates an example data flow of generating a text output using a generative artificial intelligence model and a knowledge hub.

FIG. 3 illustrates an example data flow of generating a text output using a generative artificial intelligence model. FIG. 3 is a simplified flow diagram of an embodiment of operations that can be performed by at least one device of a computing system. The operations of a flow 300, as shown in FIG. 3 can be implemented using processor-executable instructions that are stored in computer memory. For purposes of providing a clear example, the operations of FIG. 3 are described as performed by computer system 100, but other embodiments may use other systems, devices, or implemented techniques. One or more operations in FIG. 3 may be performed by one or more components as described in FIG. 1; for example, the text processor 140 can be programmed, using one or more sequences of instructions, to execute an implementation of FIG. 3. While the various operations in FIG. 3 are presented and described sequentially, one of ordinary skill in the art will appreciate that some or all the operations may be executed in different orders, may be combined or omitted, and some or all the operations may be executed in parallel. Furthermore, the operations may be performed actively or passively.

FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

Flow 300 begins at step 305 in which text input is received from a user from a client device such as computing device 102. The text input can comprise a plurality of words in a prompt. In particular, the text input can be the source text 130 (FIG. 1), a call, request, or message with the source text, an application protocol message with the source text, an HTTP POST request with the source text as a payload, or other digitally stored text received using other programmed mechanics. For purposes of illustrating a clear example, assume that the text input includes or references an internal project name or a term from an external data source. For example, the text processor 140 can receive text input, such as “project ML” in a prompt from a user or computing device 102.

At step 310, a server computer accesses common knowledge associated with a knowledge hub. “Common knowledge,” in this context, can refer to digitally stored data representing definitions of terms, identifications of users, tone-specific text, and templates that help to write content information, the knowledge being keyed to or indexed using the internal project name or term. In one embodiment, upon receiving the text input from the client device, the text processor 140 is programmed to access the common knowledge by calling the knowledge hub. The text processor 140 can use the data corresponding to the common knowledge to add context associated with the text input based on recognized terms from the knowledge hub.

Control then transfers to step 315 to generate contextual features in a query associated with the text input using a generative artificial intelligence model. For example, the generative artificial intelligence model can comprise a trained large language model that receives the text input as a prompt and receives the common knowledge as context associated with the text input and produces output text in response. As another example, the generative artificial intelligence model can be trained to use a natural language processing algorithm to generate a plurality of parameters associated with the text input based on the common knowledge associated with the knowledge hub. In some embodiments, the text processor 140 can apply the similarity function to map the plurality of parameters associated with the text input to unique contextual features in a query that characterizes the text input.

At step 320, a text output can be generated using the generative artificial intelligence model and the contextual features in the query associated with the text input. In particular, the generative artificial intelligence model can include a multi-class neural network to modify the text output in a plurality of attributes using the contextual features in the query associated with the text input. The plurality of attributes comprises two or more of correctness, clarity, length, simplification, diversity, sensitivity, and tone.

At step 325, instructions are sent to the client device for presenting a user interface comprising the text output. The text processor 140 can present the text output to improve communication to overcome various communication problems in rewriting the input text and enhance understanding and productivity.

2.3 Graphical User Interface Example

Figure 4:
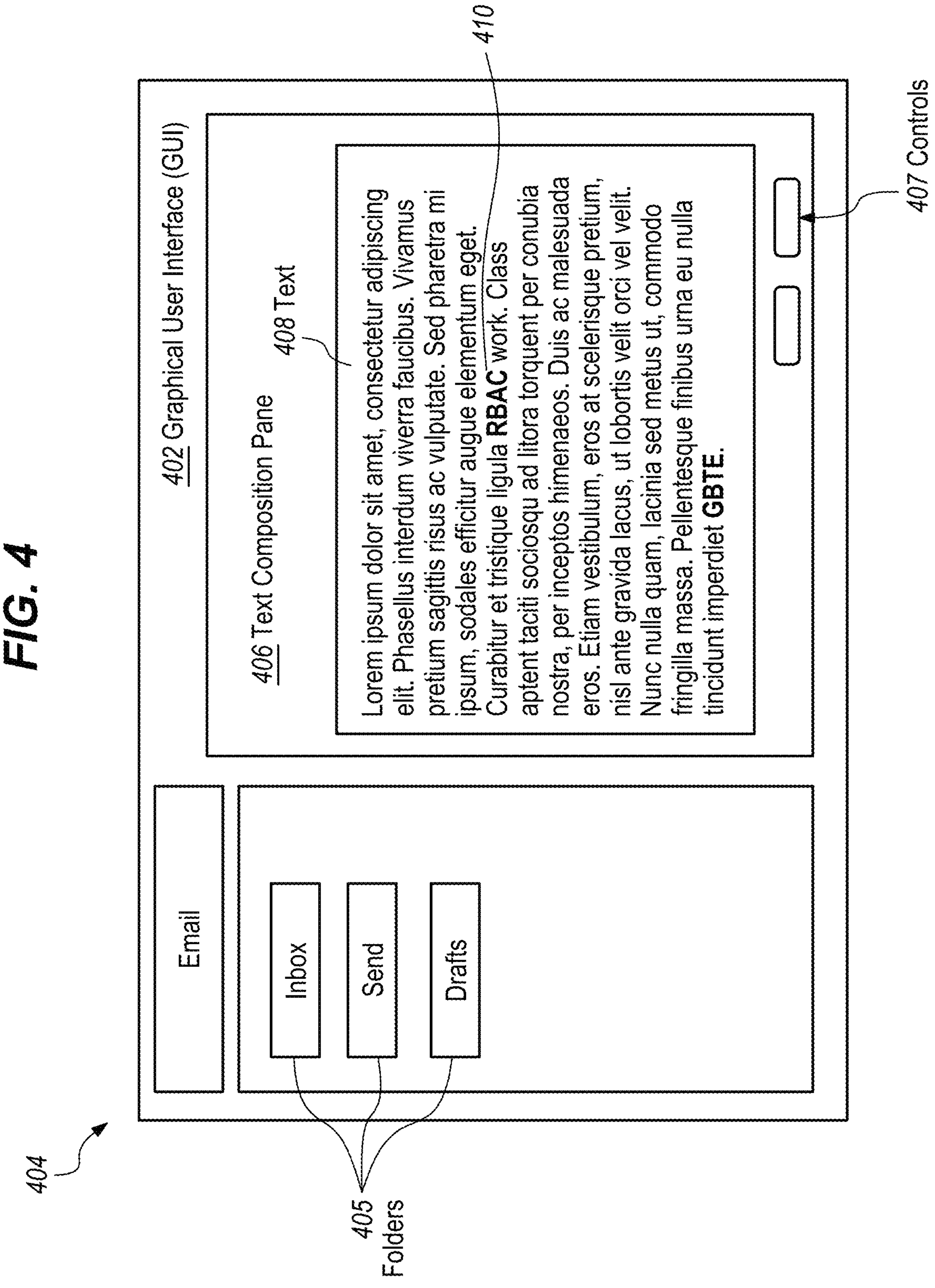
FIG. 4 illustrates an example of a graphical user interface of an electronic mail (email) client.

FIG. 4 illustrates an example of a graphical user interface of an electronic mail (email) client with which an embodiment can be used. In the example, computing device 102 displays a graphical user interface (GUI) 402 generated from an email client 404 and includes a message composition panel 406, text 408, and acronym 410. The email client 404 can display folders 405 and controls 407, which are implemented as active links to invoke functions or store messages in folders. The example email message represented in text 408 includes a plurality of acronyms such as the first acronym 410, "RBAC," "GBTE," and any number of others. FIG. 4 can represent one example of a starting point from which the knowledge hub can be invoked to obtain information to explain or supplement text 408.

Figure 5A:
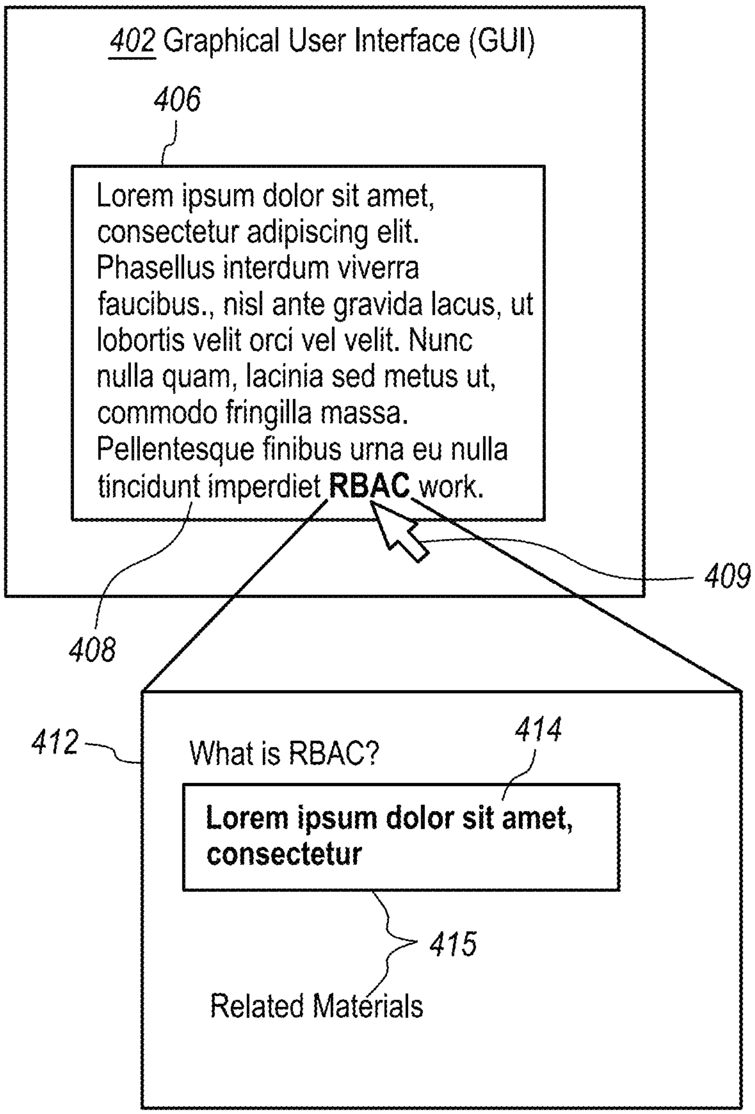
FIG. 5A illustrates an example of a portion of the GUI of FIG. 4 in which input from a computing device has moved a cursor or other location indicator to the acronym RBAC.

FIG. 5A illustrates an example of a portion of the GUI of FIG. 4 in which input from the computing device has moved a cursor or other location indicator to the acronym RBAC. In the example of FIG. 5A, the GUI 402 comprises the text composition panel 406 with the text 408; the acronym RBAC is at a cursor position 409 and has been selected. In response, the knowledge suggestion check 144C is programmed to transmit presentation instructions to the computing device 102 that causes rendering and displaying a pop-up panel or knowledge card 412 titled WHAT IS RBAC? and containing text 414 that specifies a definition 415 of the acronym RBAC and one or more elements of other information such as related materials.

Figure 5B:
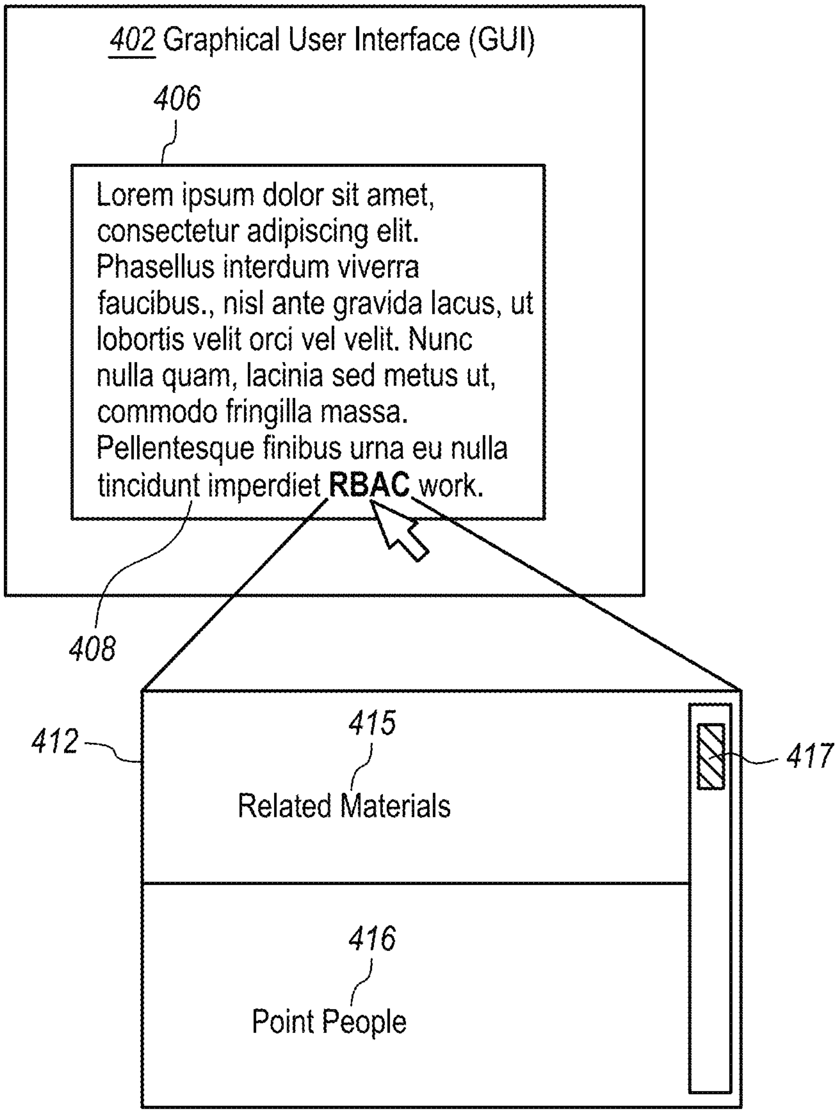
FIG. 5B illustrates an example of a portion of the GUI of FIG. 5A.

FIG. 5B illustrates an example of a portion of the GUI of FIG. 5A after input specifying a scroll operation has caused displaying another portion of the knowledge card of FIG. 5A. In some embodiments, the knowledge card also includes first active hyperlinks to networked resources with related information, such as web pages, and second active hyperlinks to information about people who are involved in a relevant enterprise with a project that is associated with the acronym. In the example, the GUI 402 comprises the text composition panel 406, and in response to input to scroll the knowledge card 412, the text 414 has moved upward, and an additional element 416 is shown. In an embodiment, the additional element 416 can specify people in the organization who know the selected term, who work on a related project, who are in a relevant organizational unit, or who have other relevance of the selected term.

Figure 5C:
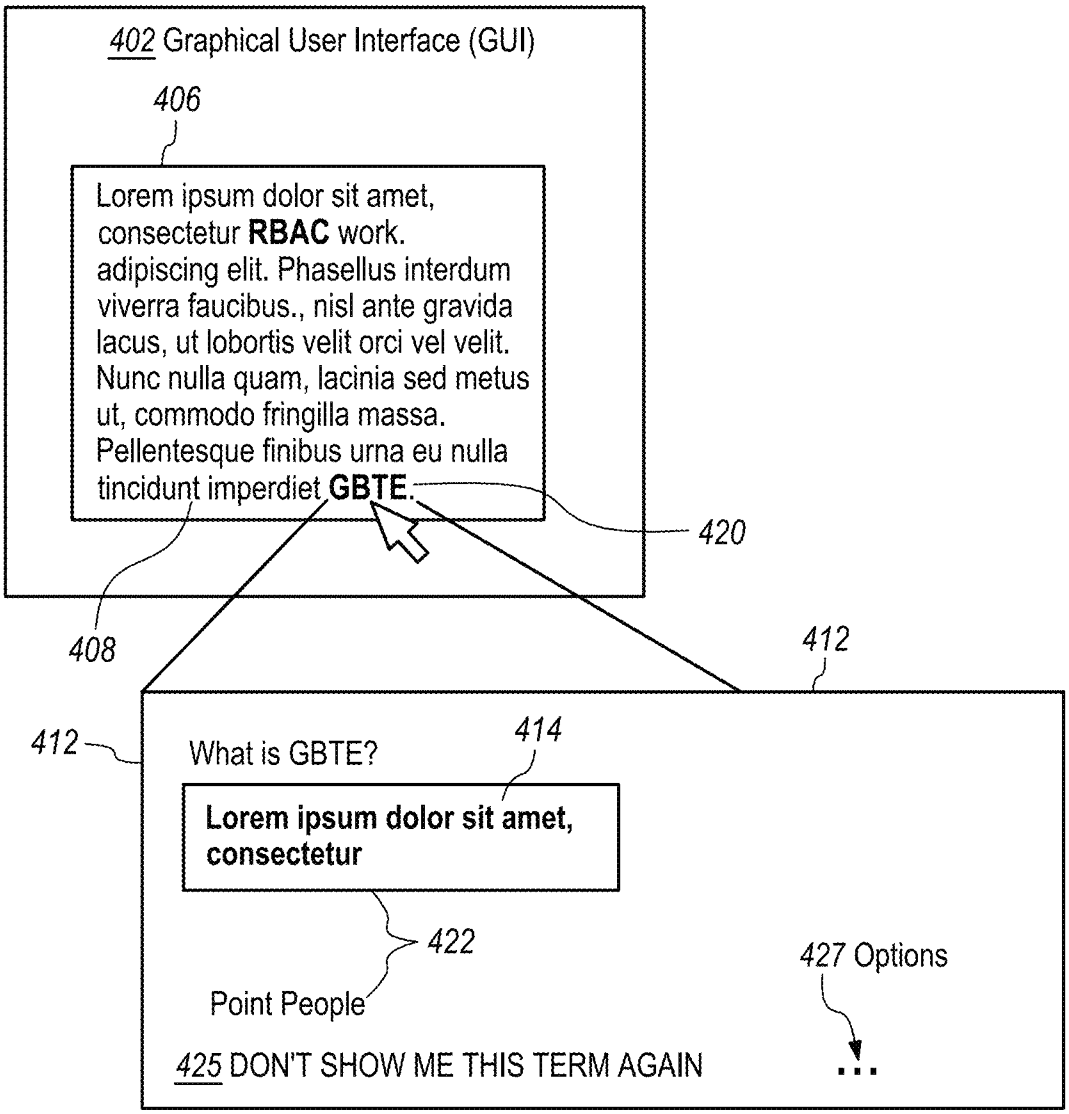
FIG. 5C illustrates an example of the GUI of FIG. 5A, FIG. 5B.

FIG. 5C illustrates a further example of the GUI of FIG. 5A, FIG. 5B focused on a different term in the text. In the example, GUI 402 comprises the message composition panel 406 with the text 408, and input from a computing device 102 has moved to a second acronym 420 denoted GBTE. In response, knowledge card 412 displays text and links 422, which have been obtained by queries to the knowledge hub. Further, knowledge card 412 comprises an active hyperlink 425 titled DON'T SHOW ME THIS TERM AGAIN. In an embodiment, input from the computing device 102 to select the hyperlink causes the knowledge suggestion to check 144C to store, in data store 160, a column attribute specifying that the term represented in the knowledge card should not be displayed for the currently logged-in user, account, or computing device 102.

Figure 5D:
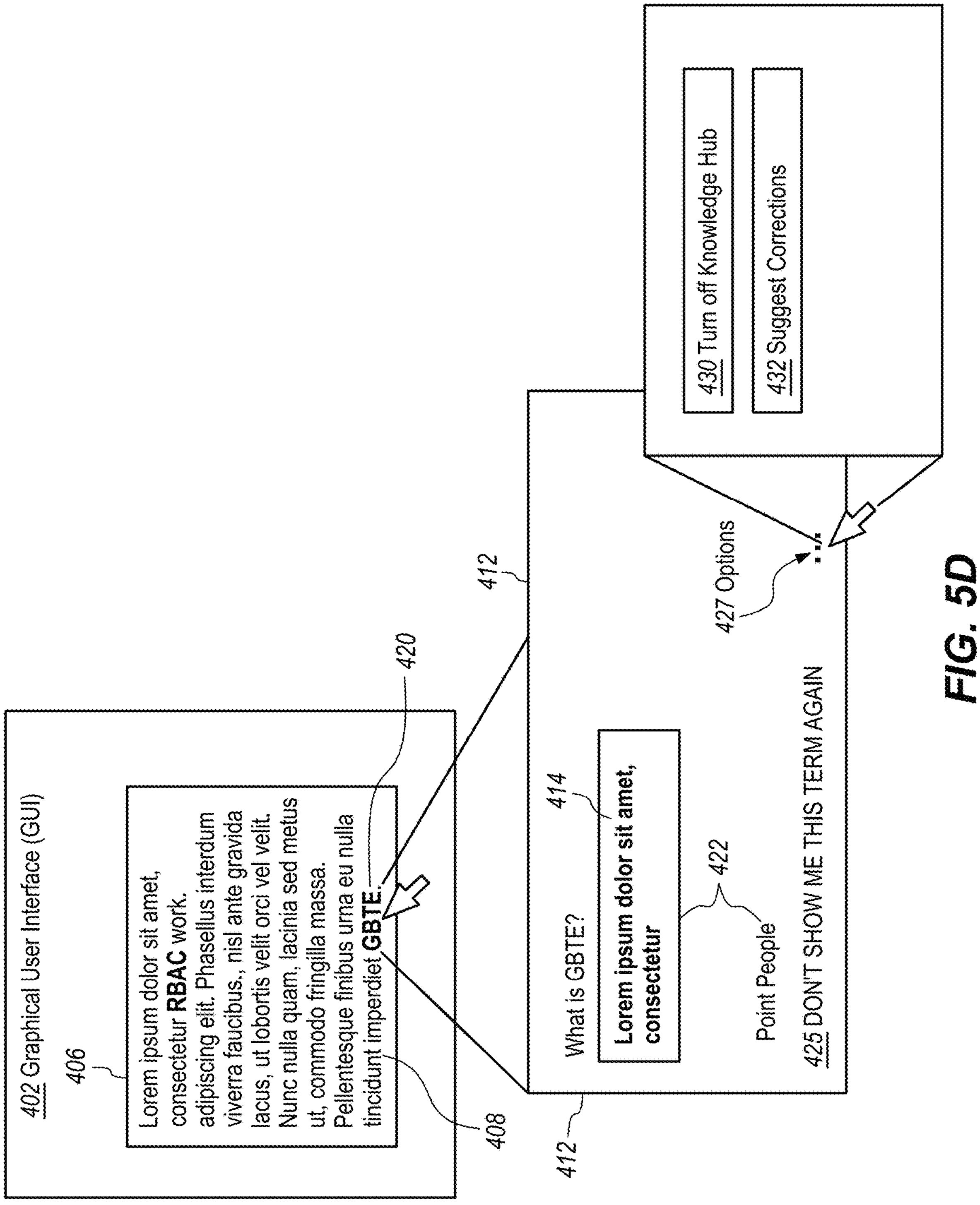
FIG. 5D illustrates an example of the GUI of FIG. 5A, FIG. 5B, FIG. 5C.

Knowledge card 412 of FIG. 5C further comprises an options link 427. FIG. 5D illustrates an example of the GUI of FIG. 5A, FIG. 5B, FIG. 5C in which input from the computing device 102 has selected the options link 427, visually shown using an icon like " . . . ", to expose a sub-panel 430 that displays function links 432 titled TURN OFF KNOWLEDGE HUB and SUGGEST CORRECTION. The labels TURN OFF KNOWLEDGE HUB and SUGGEST CORRECTION are examples, and other embodiments can implement similar functionality using links with different labels; for example, EDIT could be used rather than SUGGEST CORRECTION. Input from the computing device 102 to select the function link titled SUGGEST CORRECTION can signal the knowledge suggestion check 144C to receive input from the computing device to update the knowledge card. A voting mechanism can be implemented in which at least a threshold number of the same corrections must be received before the correction is implemented in the knowledge card or the link can implement direct editing.

Figure 6A:
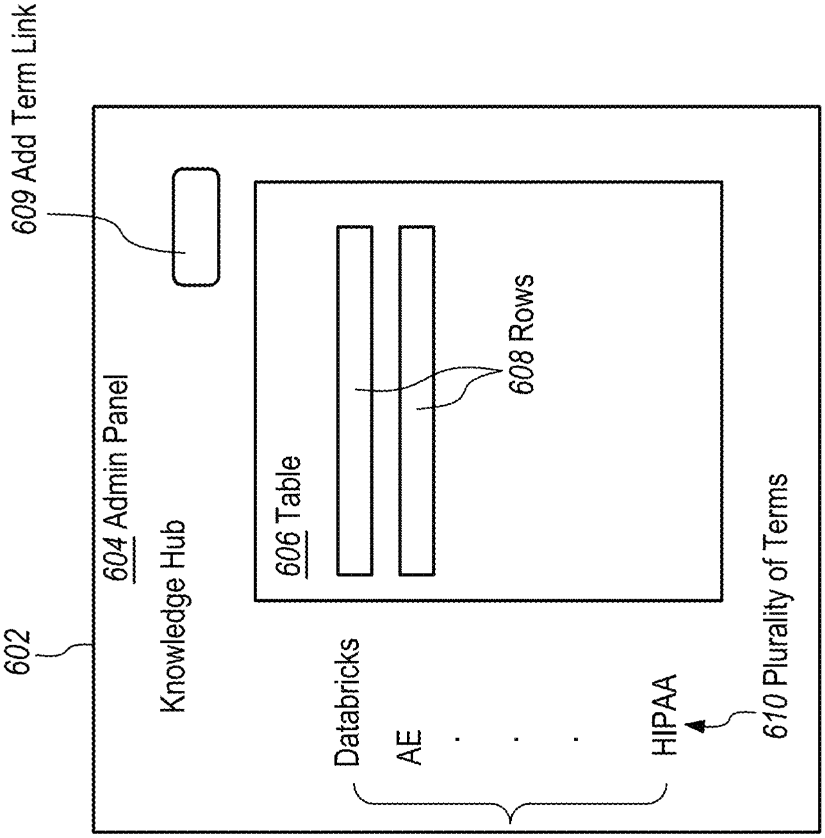
FIG. 6A illustrates an example of an administrative control panel.

FIG. 6A illustrates an example of an administrative control panel or "admin panel," which can be programmed to list all terms that an enterprise has defined in knowledge cards. In an embodiment, a GUI 602, such as a browser window, displays the admin panel 604 with a table 606 of rows 608, each row corresponding to a term among a plurality of terms 610 that can be identified in a document, highlighted, and displayed on a knowledge card. Each row 608 can have a plurality of column attributes such as term name, description, related materials, key contacts, update date, and so forth. In this manner, the admin panel presents a condensed view of complete records of data associated with terms that the data store 160 stores.

Furthermore, it will be apparent from the foregoing descriptions that the terms available via the knowledge suggestion check 144C can be stored in data store 160 using a relational table schema having a plurality of tables. A first table can store rows corresponding to terms, each row having a first column attribute for a description and second column attribute holding a link, pointer, or reference to a related materials table storing rows for one or more document records for the documents shown as "related materials" in FIG. 6A. The table schema can further define a third column attribute holding a link, pointer, or reference to a contacts table having one or more rows of contacts that are associated with the term.

Figure 6B:
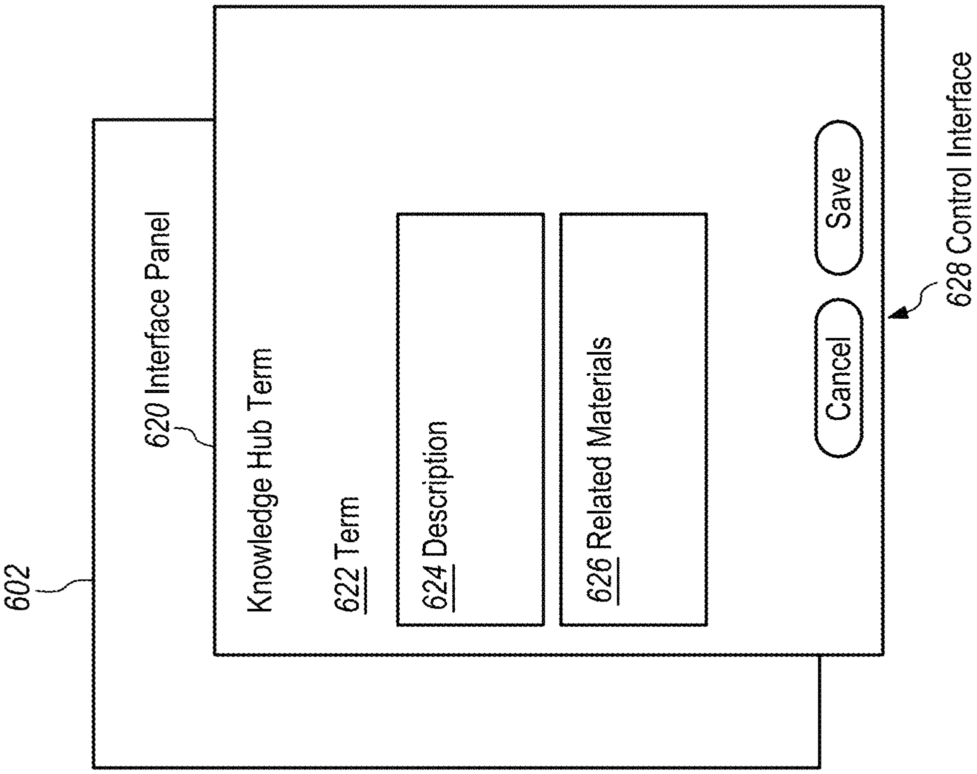
FIG. 6B illustrates an example of the admin panel of FIG. 6A.

FIG. 6B illustrates an example of the admin panel of FIG. 6A in which input from the computing device has selected a term for editing. FIG. 6B in effect exposes an interface panel 620 to read and update each of the column attributes associated with a term in the data store 160, such as term name 622, description 624, and related materials 626. The admin panel of FIG. 6A also can comprise an Add Term link 609 which triggers the knowledge suggestion check 144C to open a term editing dialog for a new term similar to that in FIG. 6B, but with values for the fields being blank.

The use of a management component or admin panel is optional and embodiments can implement the functionality of other sections of this description without providing an admin panel.

Figure 7A:
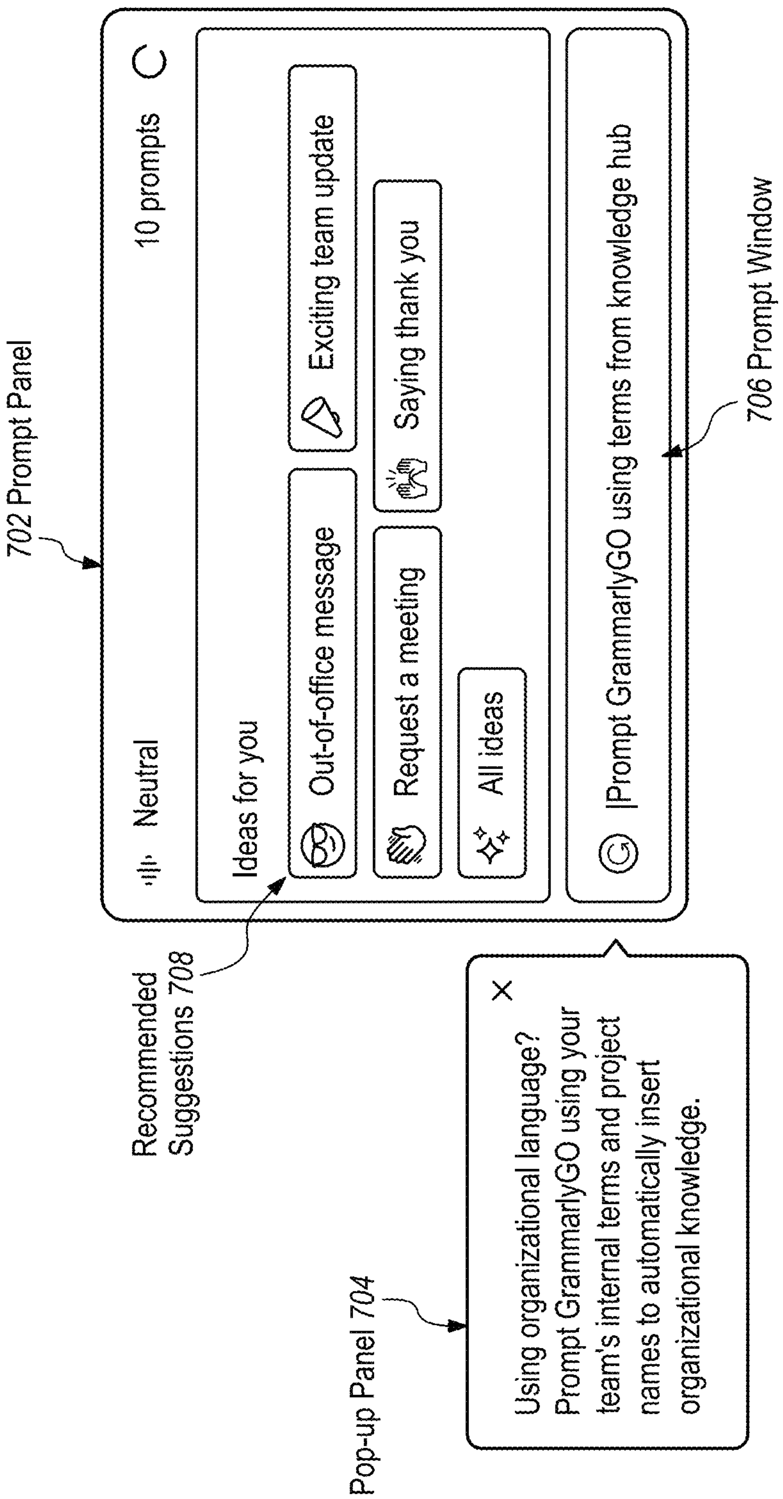
FIG. 7A illustrates an example of a prompt control panel that can be programmed to automatically incorporate context on company terminology used when composing a piece of writing or a quick reply.

FIG. 7A illustrates an example of a prompt control panel 702 which can be programmed to automatically incorporate context on company terminology used when composing a piece of writing or a quick reply. The knowledge suggestion check 144C is programmed to transmit presentation instructions to the computing device 102 that causes rendering and displaying a pop-up panel 704 when the user or computing device 102 moves a cursor near the prompt window 706 to rewrite a text using an action. The pop-up panel 704 displays helpful instructions for the user to use internal terms and project names to automatically insert organizational knowledge from the knowledge hub. Furthermore, the user can choose one or more predetermined recommended suggestions panel 708 for the internal terms and project names used in the knowledge hub.

Figure 7B:
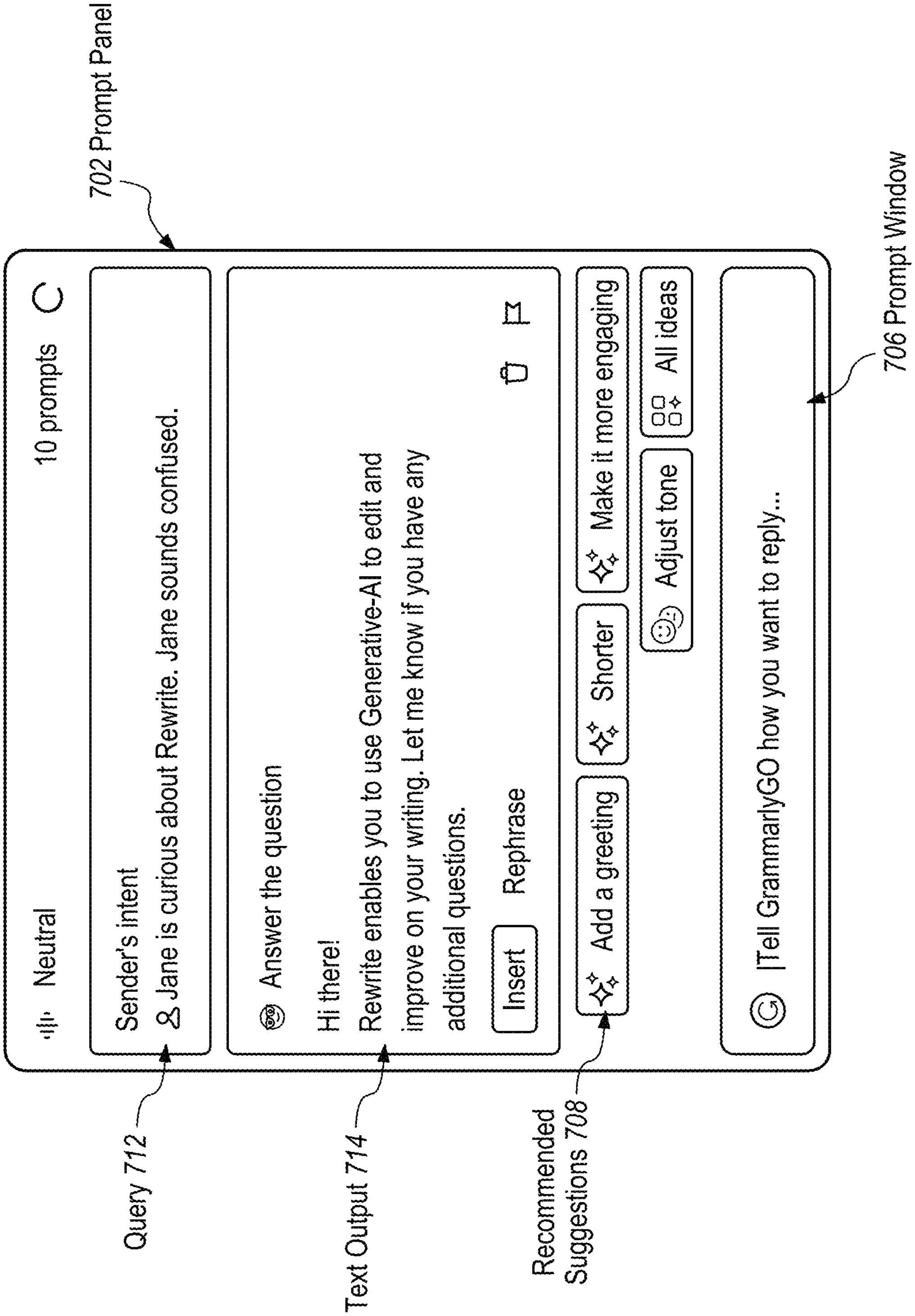
FIG. 7B illustrates an example of a text output as a quick reply in the prompt control panel 702 using a text input from a computing device.

FIG. 7B illustrates an example of a text output 714 as a quick reply in the prompt control panel 702 using a text input from a user. The prompt control panel 702 can be programmed to quickly incorporate context from one or more relevant terms in the knowledge hub when a user rewrites a text input. In particular, the prompt control panel 702 can be programmed to use the context from one or more relevant terms in the knowledge hub to determine a query 712 which is aligned with the user's intent. Furthermore, the user can use prompt window 706 to give different instructions based on the pop-up panel 704 to further modify the text output 714.

Figure 7C:
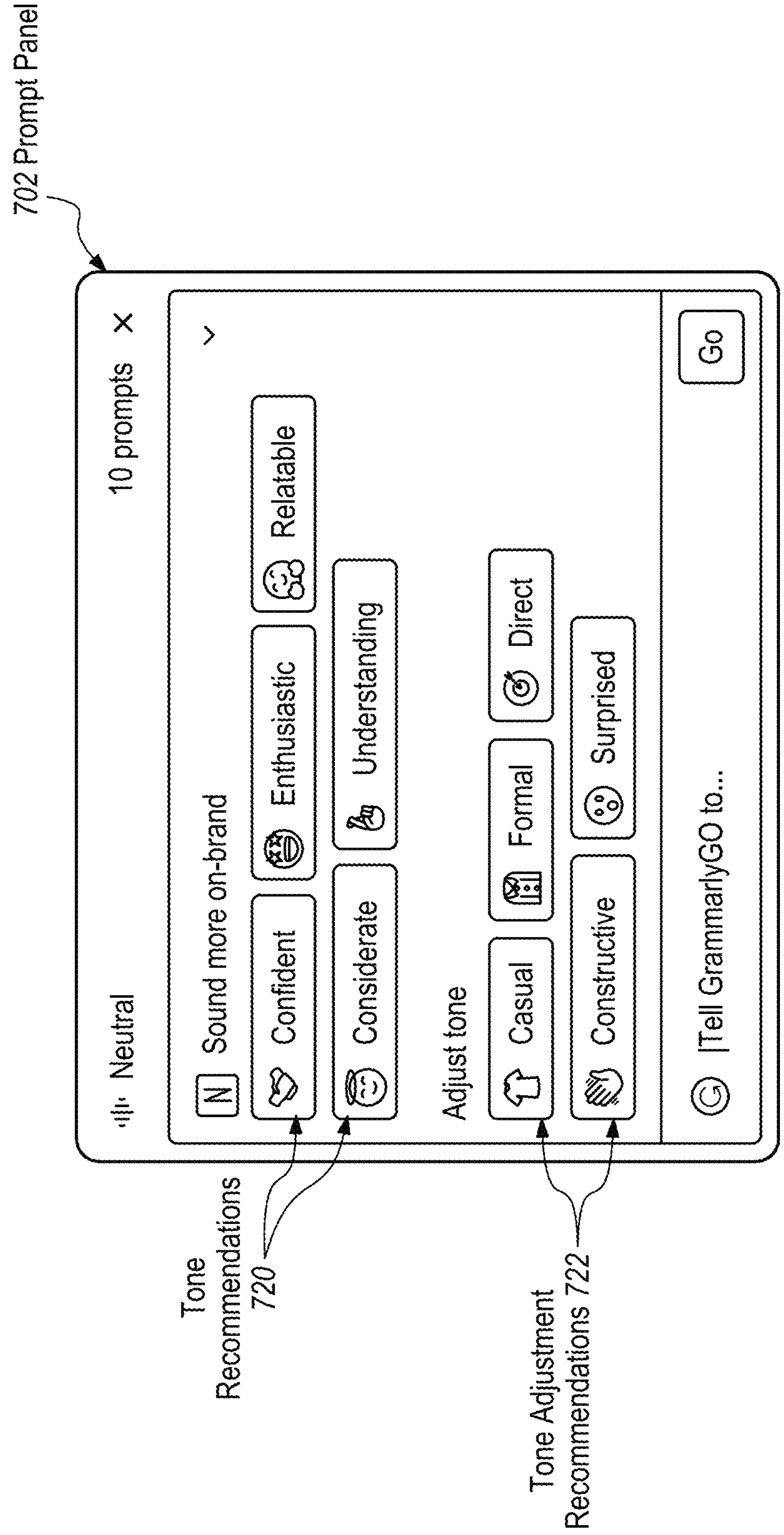
FIG. 7C illustrates an example of tone recommendations and tone adjustment recommendations in the prompt control panel.

FIG. 7C illustrates an example of tone recommendation 720 and tone adjustment recommendation 722 in the prompt control panel 702. In particular, when the user rewrites a text input, the prompt control panel 702 can be programmed to display a "Sound more on-brand" section in the prompt panel 702 which shows a list of on-brand tones, such as tone recommendations 720, that can quickly be applied to the user's writing. In addition, the prompt control panel 702 can be programmed to display an "Adjust tone to be on-brand" action with one or more tone adjustment recommendations 722. One or more tone adjustment recommendations 722 can be applied to modify the user's writing more on-brand based on the user's selected tone adjustment settings.

Figure 7D:
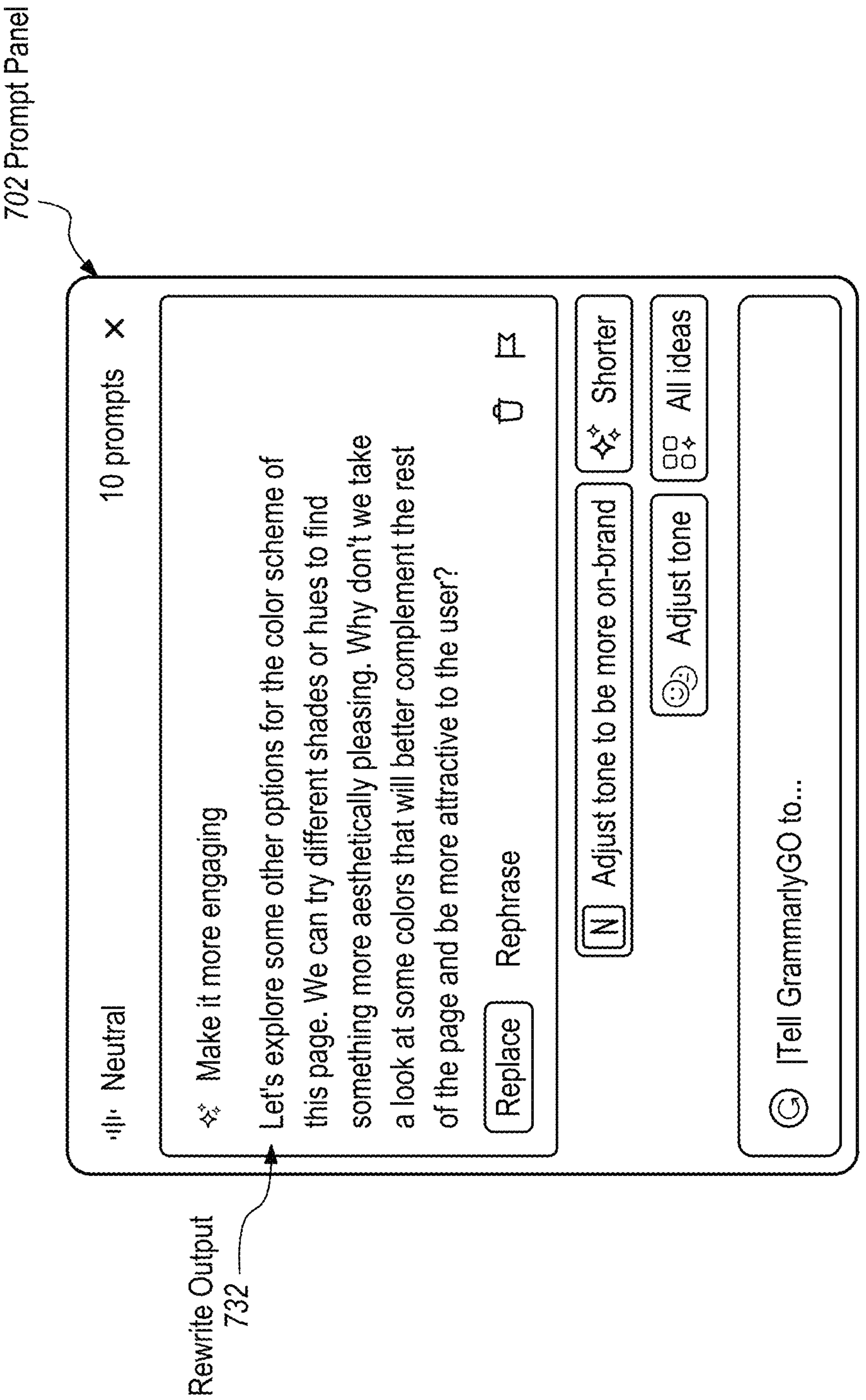
FIG. 7D illustrates an example of a rewrite output in the prompt control panel based on tone recommendations and tone adjustment recommendations.

FIG. 7D illustrates an example of a rewrite output 732 in the prompt control panel 702 based on tone recommendations 720 and tone adjustment recommendations 722. In particular, when the user rewrites a text input, the prompt control panel 702 can be programmed to modify the user's write by adjusting the tone to be more engaging.

Figure 7E:
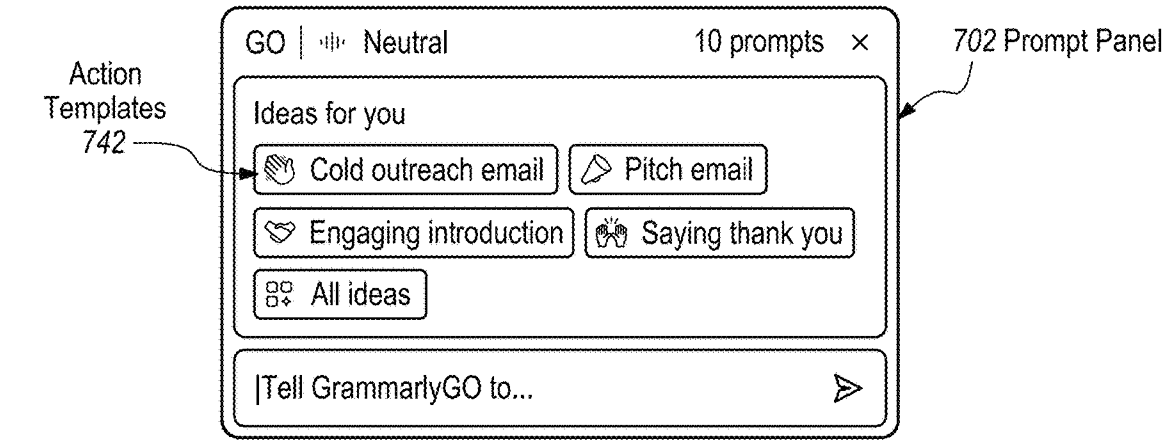
FIG. 7E illustrates an example of one or more action templates in the prompt control panel.

FIG. 7E illustrates an example of one or more action templates 742 in the prompt control panel 702. In particular, when the user rewrites a text input, the prompt control panel 702 can be programmed to modify the user's write using one or more action templates 742, such as "Cold outreach email," "Pitch email," "Engaging introduction," and "Saying thank you."

Figure 7F:
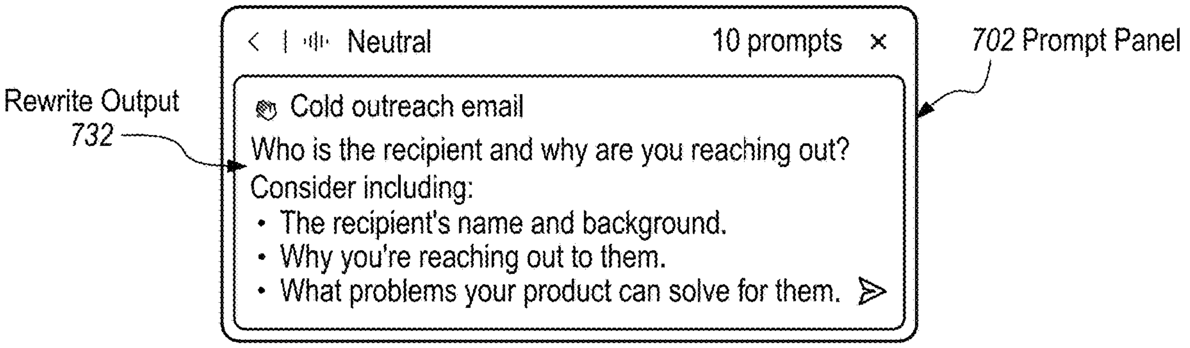
FIG. 7F illustrates an example of a rewrite output using an action template in the prompt control panel.

FIG. 7F illustrates an example of a rewrite output 732 using an action template in the prompt control panel 702. In particular, the write output 732 is generated using the "Cold outreach email" action template.

Figure 7G:
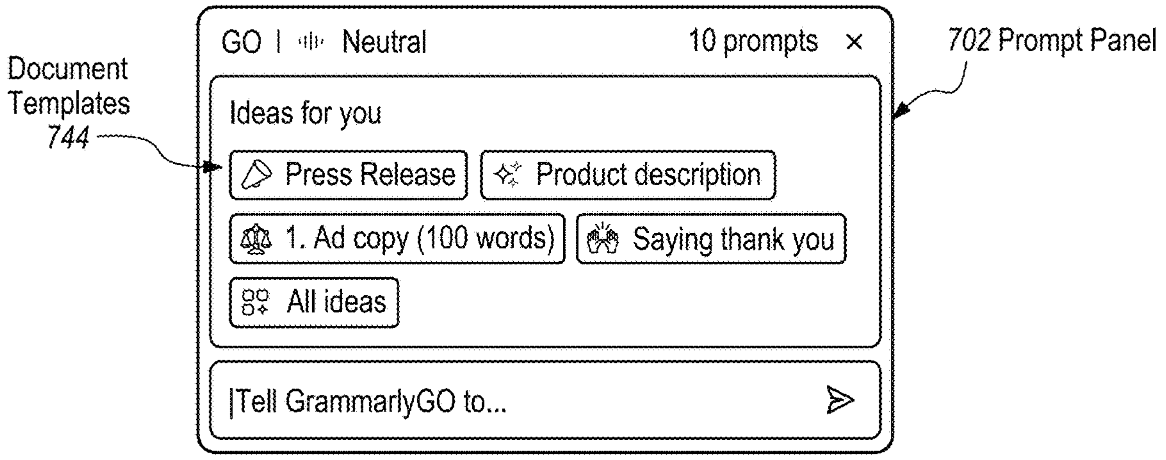
FIG. 7G illustrates an example of document templates in the prompt control panel.

FIG. 7G illustrates an example of document template 744 in the prompt control panel 702. In particular, the prompt control panel 702 can be programmed to use the write output 732 to create quickly create sales emails, marketing announcements, and recruiting outreach emails based on the document templates, such as "Press Release," "Product description," "Ad copy," and "Saying thank you." As a result, a user can create a new document relevant to the user's role to improve a particular document based on best practices using recommended suggestions panel 708, tone recommendations 720, tone adjustment recommendations 722, action templates 742, and document templates 744.

Figure 8:
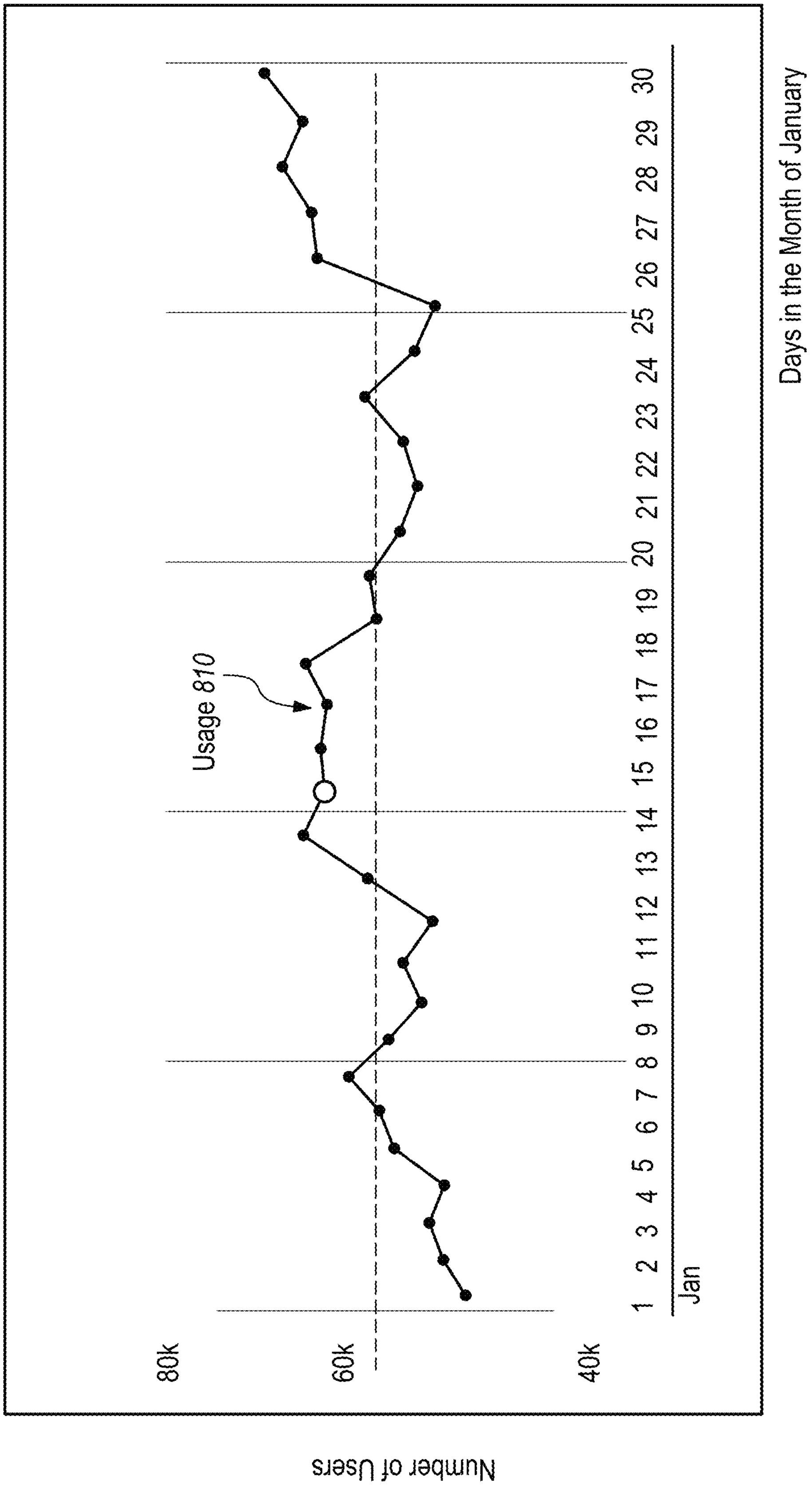
FIG. 8 illustrates an example of feature usage metrics used by a team of users.

FIG. 8 illustrates an example of feature usage metrics, such as usage 810, used by a team of users. The usage metrics is plotted for the month of January as indicated by the horizontal axis, and number of users are shown on a vertical axis. The feature metrics can be used to evaluate the performance of the text process 140 and the knowledge hub. For example, FIG. 8 shows the text process 140 and the knowledge hub has a steady usage 810 in January with an average number of users being about 60,000 (60k), indicating a positive impact of the text process 140 on business and product management.

2.4 Recognition of Terms

In an embodiment, the knowledge suggestion check 144C and/or knowledge suggestion instructions 148 are programmed to detect entities, acronyms, and keywords in the source text 130 for use in queries to the knowledge hub and in support of the other functions that have been described. In one embodiment, the knowledge suggestion check 144C and/or knowledge suggestion instructions 148 are programmed to access or use a Named Entity Recognition (NER) model to identify named entities, such as people, organizations, locations, products, and others (see the taxonomy below) in the source text 130, an acronyms detection model to identify acronyms and their corresponding definitions in the text, and a keywords detection model to identify important keywords and phrases in the text. Some embodiments can interoperate with a model that can detect definitions in text, allowing the knowledge suggestion check 144C to identify terms and their definitions within a document.

In one embodiment, the NER model is programmed for identifying and classifying named entities in text. Named entities are proper nouns that refer to specific things, such as persons, organizations, locations, dates, and so on. A NER model can implement an API that the knowledge suggestion check 144C or other services can call. In an embodiment, the API is accessible using a specified public URL and accepts a request with the format:

| Request | | |
|---|---|---|
| sentences | [str] | List of sentences to detect NE in. |
| client | str | String description of the client |

And responds as:

| Response | | |
|---|---|---|
| response | [[NamedEntity, . . . ], . . . ] | List of named entities for every sentence. If no entities were detected for a given sentence - the corresponding item would be an empty list |
| version | str | API version |

Where each NamedEntity has the following structure:

| NamedEntity | | |
|---|---|---|
| span | {"beg": int, "end": int} | Span of NE within a sentence |
| text | str | NE text. The same as the text in the range [beg:end). |
| label | str | One of the NER tags (see below) |
| score | double | Confidence score |

NER tags can comprise:

| | |
|---|---|
| CARDINAL | cardinal value |
| DATE | date value |
| EVENT | event name |
| FAC | building name |
| GPE | geopolitical entity |
| LANGUAGE | language name |
| LAW | law name |
| LOC | location name |
| MONEY | money name |

-continued

| | |
|---|---|
| NORP | affiliation |
| ORDINAL | ordinal value |
| ORG | organization name |
| PERCENT | percent value |
| PERSON | person name |
| PRODUCT | product name |
| QUANTITY | quantity value |
| TIME | time value |
| WORK_OF_ART | name of work of art |

In one embodiment, the acronyms component is programmed to detect a word or name formed as an abbreviation from the initial components in a phrase or a word; the initial components may be individual letters or parts of words. An acronyms model or component can implement an API that the knowledge suggestion check 144C or other services can call. In an embodiment, the API is accessible using a specified public URL and accepts a request with the format:

| Request | | |
|---|---|---|
| sentences | [str] | List of sentences to detect acronyms in. |
| client | str | String description of the client |

And responds as:

| Response | | |
|---|---|---|
| response | [[Acronym, . . . ], . . . ] | List of acronyms for every sentence. If the acronyms weren't found, an empty list will be returned. |
| version | str | API version |

| Acryonym | | |
|---|---|---|
| acronym | AcronymItem | Detected acronym. |
| description | list[AcronymItem] | List of all detected acronyms descriptions. There might be none or multiple items detected |

| AcronymItem | | |
|---|---|---|
| text | str | Text |
| span | {"beg": int, "end": int} | Span of an acronym within a sentence |

In one embodiment, the keywords component is programmed to detect or identify individual words or phrases that have special significance. They are often used to identify important information or themes. For example, the keyword "revenue" might be used to identify discussions or information related to the income or profits generated by a business or organization. A keywords model or component can implement an API that the knowledge suggestion check 144C or other services can call. In an embodiment, the API is accessible using a specified public URL and accepts a request with the format:

| Request | | |
|---|---|---|
| sentences | [str] | List of sentences to detect Keywords in. |
| client | str | String description of the client |

And responds as:

| Response | | |
|---|---|---|
| response | [[Keyword, . . . ], . . . ] | List of keywords for every sentence. If no entities were detected for a given sentence - the corresponding item would be an empty list |
| version | str | API version |

Where each Keyword has the following structure:

| Keyword | | |
|---|---|---|
| span | {"beg": int, "end": int} | Span of a keyword within a text |
| text | str | Keyword text. The same as the text in the range [beg:end). |

A definition is a statement that explains the meaning of a term. Definitions can be found in texts that include terms and their explanations. A definitions model or component can implement an API that the knowledge suggestion check 144C or other services can call. In an embodiment, the API is accessible using a specified public URL and accepts a request with the format:

| Request | | |
|---|---|---|
| sentences | [str] | List of sentences to detect definitions in. |
| client | str | String description of the client |

And responds as:

| Response | | |
|---|---|---|
| response | [Definition, . . . ], . . . ] | List of definitions found in every sentence. If no definitions were detected for a given sentence - the corresponding item would be an empty list |
| version | str | API version |

Where a definition is:

| Definition | | |
|---|---|---|
| term_text | str | Term text |
| term_span | {"beg": int, "end": int} | Span of a term within a text |
| def_text | int | Definition text |
| def_span | {"beg": int, "end": int} | Definition span |

2.5 Access to Enterprise Data

In some embodiments, the LLM 154 is trained on a large corpus of documents and messages associated with a private enterprise. Enterprise data is used to generate glossary entries or term definitions for the knowledge hub. Text generation and other intelligent features also derive from internal company data, which is known to be sensitive. Embodiments are preferably configured using high-security database systems.

Data ingestion can be accomplished from the server side without copying or storing raw internal documents at the text processor 140 or data store 160 so that enterprise documents or messages do not leave the computing infrastructure of the enterprise or user. For example, data ingestion logic can be programmed to execute in cloud infrastructure and to read enterprise documents or messages using connectors for document management systems (DMSs), cloud-based documentation systems like ATLASSIAN CONFLUENCE, JIRA, GOOGLE DOCS, and email systems. As the system reads enterprise documents, data is encrypted and only the resulting ciphertext is transferred to the data store 160 using techniques that preclude administrative users of the text processor from reading the documents or messages on the server side. Embodiments can be programmed using data residency rules to confine enterprise data to storage units in the geographical area from which the data was collected.

Figure 10:
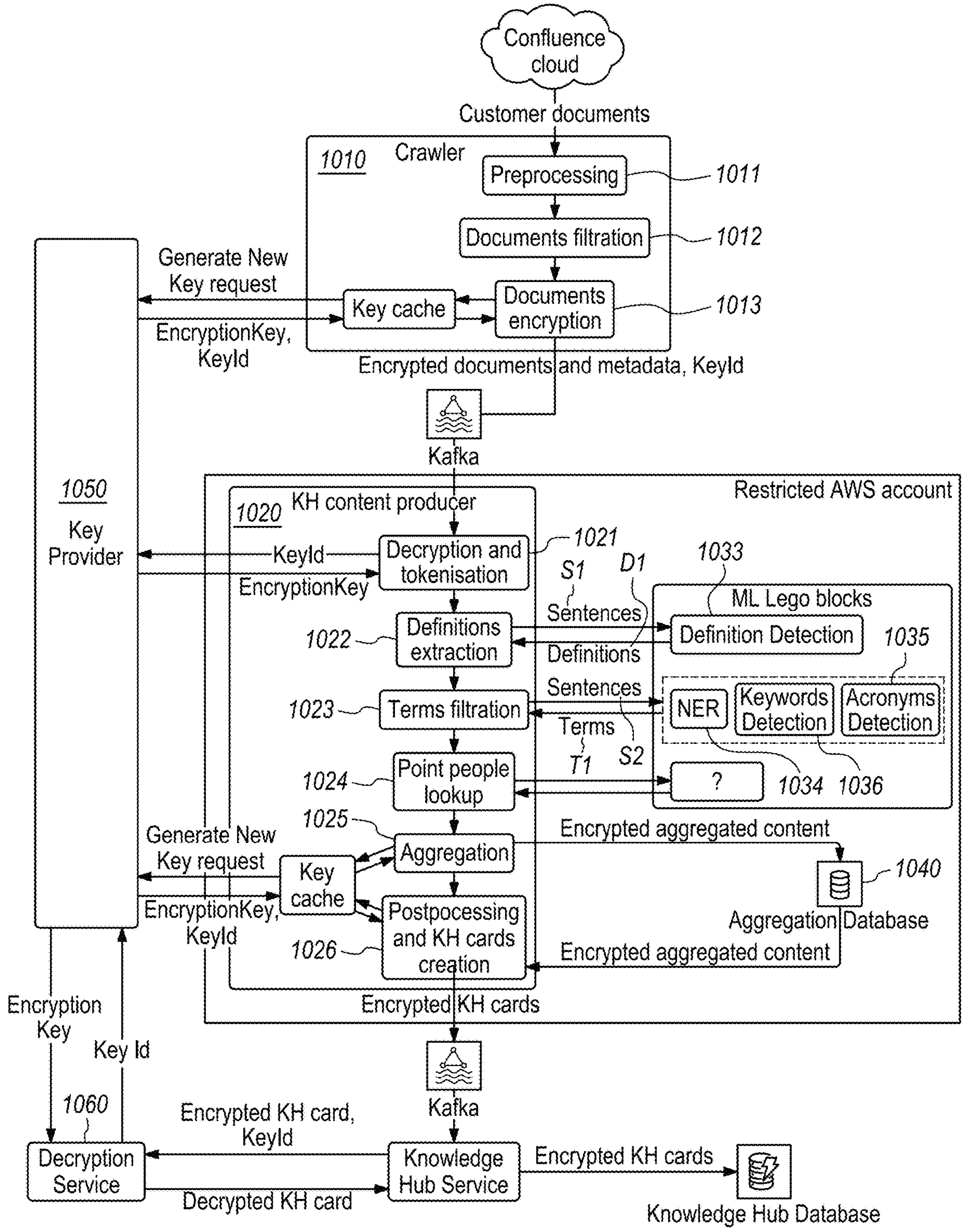
FIG. 10 illustrates a distributed computer system that is configured to perform enterprise data collection.

FIG. 10 illustrates a distributed computer system that is configured to perform enterprise data collection. The system is configured and programmed to collect documents from an enterprise document management system and extract a dataset sufficient to generate knowledge cards, as described in other sections. In an embodiment, the data to be extracted include terms that are often found in the documentation; descriptions of the terms; documents related to the terms; and identification of key people who can provide information about the terms. In an embodiment, all processing of the documents executes in a secure computing environment, typically an environment that is associated with an owner or operator of the text processor 140. During any storage operation, the documents or any data extracted from them are encrypted, and access to the encryption keys is restricted and can be audited. Sensitive data is excluded from processing.

In an embodiment, the system of FIG. 10 comprises a Crawler 1010, which is a set of program instructions that are programmed to collect documents from the customer's document management system, execute pre-processing 1011, encrypt the resulting data using documents encryption 1013, and stream the data to a Content Producer 1020 as shown in FIG. 10. More details of Crawler 1010 are described herein in other sections. In an embodiment, in pre-processing 1011, Crawler 1010 is programmed to extract the raw document text and collect the document metadata; examples include the document author, document creation/update time, and document analytics data, but other embodiments may read other metadata.

In the documents filtering stage (documents filtration 1012, as shown in FIG. 10), Crawler 1010 is programmed to filter out sensitive data; filtering can execute in a virtual server instance of Crawler 1010 before storing documents in a digital data repository, to assure that sensitive data is not stored in a location that is accessible to an unrelated processing pipeline. After filtering, Crawler 1010 is programmed, via documents encryption 1013, to generate an encryption key (if needed) and encrypt the documents, then store them. Crawler 1010 can be programmed to generate a new key for every run for an institution or to generate a new key for every n document to improve data protection.

In an embodiment, Content Producer 1020 is programmed to execute a document processing pipeline. In one implementation, in a decryption and tokenization stage 1021, Content Producer 1020 is programmed to decrypt documents and split them into sentences. An identifier of the encryption key can be transmitted with the document. Content Producer 1020 is programmed to retrieve the appropriate key from key storage and use it to decrypt the document.

In a definitions extraction stage 1022, a definitions endpoint 1033 is programmed to extract the term definitions from sentences S1, as shown in FIG. 10, of the document and programmatically return data pairs (definitions D1, as shown in FIG. 10), each pair comprising a candidate phrase and description. In some embodiments, not every data pair will be a definition of a valid term. Therefore, in an embodiment, in a data pair filtering stage 1023, each data pair is inspected to determine whether it is a valid term. Data pair filtering can occur for three endpoints or services that identify terms in a document, such as the NER 1034, acronyms 1035, and keywords 1036 components described above. A united list of terms T1, as shown in FIG. 10, from all the components can be used to filter valid term definitions from the previous step and to build associations between terms and sentences S2 in the documents. A point people lookup component can be programmed to identify people and their associations with the terms. In one embodiment, a minimal implementation of a point people lookup 1024 component can associate, in digital storage, the author of the document with all the terms found in it.

In an embodiment, in an aggregation stage 1025, the data collected in the previous operations are aggregated within the database. Aggregated state 1025 can contain the following data for every term: Zero, one, or several definitions; a List of the people who wrote about the term (for the first version); a List of the documents in which the term is present. The aggregated state data can be encrypted. As with document encryption, the system can be programmed to generate one key for each execution of Crawler 1010; other embodiments can use separate keys for different parts of the state data.

In an embodiment, a post-processing step 1026, executed after the crawling process is complete, is programmed to analyze the complete aggregated dataset, filter the most relevant data, and create knowledge hub cards using the relevant data. The post-processing steps can be programmed to: Filter out meaningless terms; Select the most appropriate definition for the terms that have more than one definition; Select the most relevant documents for the terms; Select the most relevant people for the terms. Filtering can be programmed using digitally stored patterns, statistical and lexicographical algorithms, or a combination thereof. Embodiments also can be programmed to execute a document ranking algorithm based on document age (according to the creation/update time) and usage statistics (available in analytics data of the DMS); train or form a content ranking algorithm based on the ranks of the documents it was produced from; re-run, analyze the final content, and fine-tune the algorithms until we acceptable data quality occurs.

In some embodiments, lifecycle tokens can be created and transmitted programmatically among functional units to control changes in data storage. For example, a Start token received by Content Producer 1020 can cause Content Producer 1020 to delete the aggregated state data, if it is left from the previous run, and prepare it for a new run. An End token can trigger Content Producer 1020 to execute the post-processing stage, as described above, and wipe the aggregated state afterward. Receiving a Terminate token can cause Content Producer 1020 to wipe the aggregated state without producing any content.

In one embodiment, an Encryption Service executes asynchronously with respect to the Content Producer 1020 and responds to calls from Content Producer 1020 or its functional units. In an embodiment, the Encryption Service is programmed to provide encryption and decryption functionality for Crawler 1010, Content Producer 1020, and other functional units of the knowledge hub. In some embodiments, the Encryption Service can be programmed to provide end-users with control over the content stored with the knowledge hub via key rotation functions and key revocation functions.

In one embodiment, the Encryption Service is programmed, for each enterprise user of the knowledge hub, to generate a key encryption key (KEK) using Key Provider 1050 and a data encryption key (DEK) using Decryption Service 1060. Both keys can be American Encryption Standard (AES) 256-bit keys. Each item of customer data is encrypted using the DEK. The DEK is encrypted using the KEK based on standard key wrap protocols. When Amazon Web Services (AWS) is the cloud hosting environment, the KEK is encrypted with the AWS KMS; other embodiments can use AZURE, GOOGLE CLOUD, or other virtual computing environments. Each pair (encrypted KEK, encrypted DEK) is stored in a database. After executing a decrypting operation, the system stores the DEK in a cache for one day. In some embodiments, an enterprise can elect a "Daily rotation" option which, if enabled, causes the system to generate a new KEK/DEK pair each day.

Figure 11:
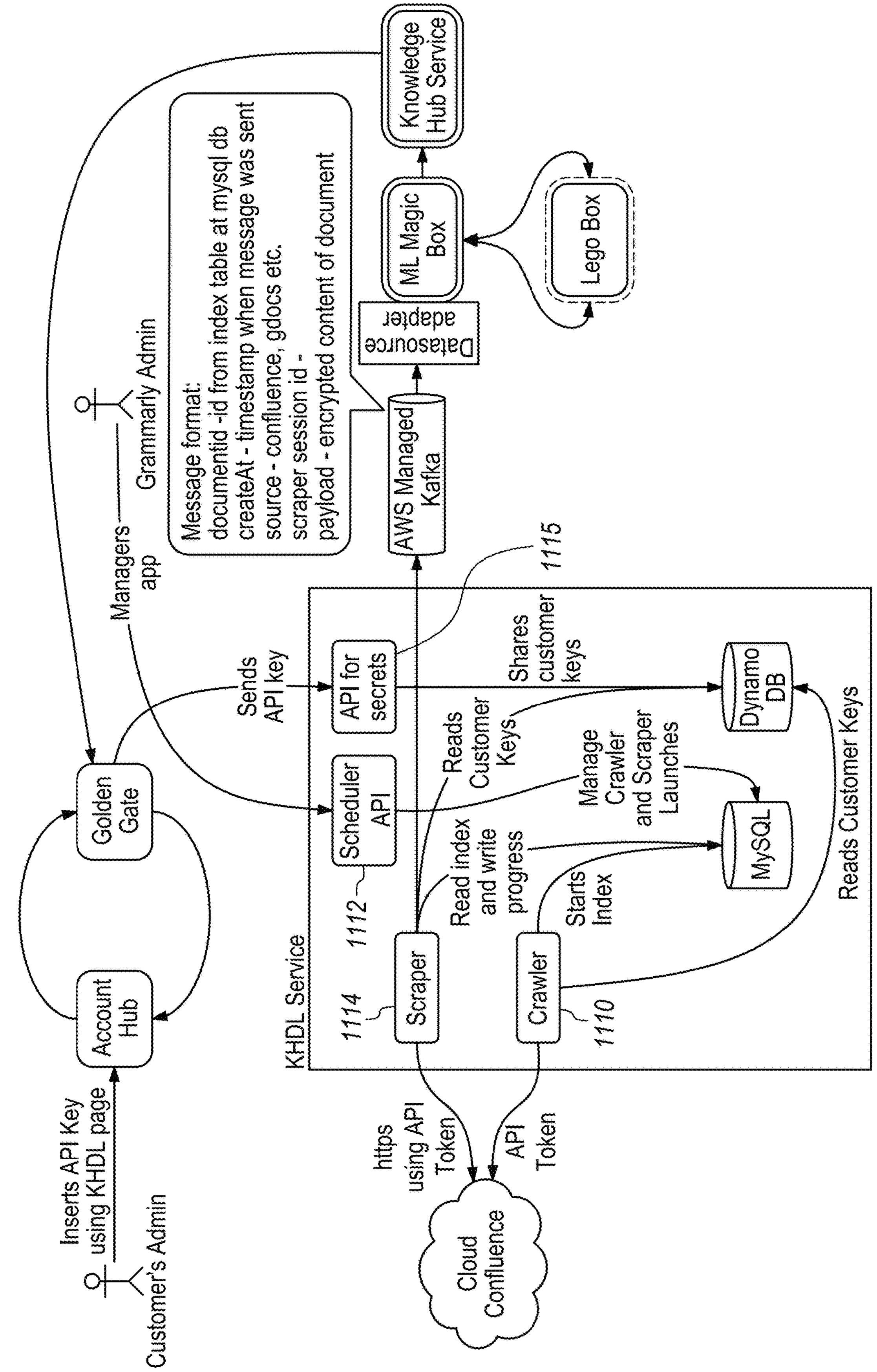
FIG. 11 illustrates another embodiment of functional components that can be programmed to access and ingest data from enterprise documents.

FIG. 11 illustrates another embodiment of functional components that can be programmed to access and ingest data from enterprise documents. In one embodiment, FIG. 11 is configured to read metadata specifying connections to a document management system; stored metadata associated with a user account can specify an endpoint or link to the DMS, login credentials, or an API key, to enable the system of FIG. 11 to programmatically connect to the DMS. The system of FIG. 11 is configured to process documents like that previously described for FIG. 10. In an embodiment, the system of FIG. 11 is programmed to store anonymized metadata such as documentId, and the last scan timestamp for each document securely. An administrative user can control the process of document extraction using a command-line interface or graphical user interface to signal to start, stop, continue, and restart operations. The system can implement a connector interface to add connectors to multiple document-sharing systems.

The system of FIG. 11 can include the following functional components:

| Component | Description of the Component in one Embodiment |
|---|---|
| Service bootstrap (not shown in FIG. 11) | Initial setup of the Spring boot based service including CI/CD, environments, and required AWS services |
| Crawler 1110 | The module responsible for creating and managing a list of pages for further scrapping |
| Scheduler API 1112 | API for scheduling management. In initial scope with bare minimum functionality, e.g. Start, Stop, and Status |
| Scrapper 1114 | The module is responsible for scrapping the page, according to the previously built list of pages. The result of scrapping should be transferred to a data repository for the knowledge hub, such as Kafka |
| Secrets API 1115 | CRUD API for management tokens for third-party document management systems. As an example - Personal Access Token from Atlassian |
| Knowledge Hub Data Layer (KHDL) | Data repository setup, using Kafka for example, that will be used to post messages with scrapped documents for further processing |
| Data source adapter | Plugin library that can read raw data source specific data from the knowledge hub data repository and transform it into the required format. As an example - extract plain text from the HTML document |

In one embodiment, the system of FIG. 11 can use the following technical infrastructure: AWS ECS cluster with private ALB; AWS RDS on MySQL; Dynamo DB; Spring boot application.

In other embodiments, an owner or operator of the text processor 140 can supply an enterprise with a dictionary-generating tool that the enterprise can execute locally, or use virtual compute instances that the enterprise controls, to generate dictionaries from enterprise data and then transfer an encrypted copy of the dictionaries to the owner or operator.

2.6 Benefits of Certain Embodiments

The present description will make apparent that embodiments offer distinct improvements over prior approaches to the relevant technical problem. Embodiments can supplement user-generated content with the in-context surfacing of relevant related knowledge. Embodiments can generate and present increasingly smart prompts for users to create and curate content. Therefore, content creation and curation become increasingly autonomous and automatic as embodiments are used, with improved relevance to the writer.

Embodiments benefit enterprises that experience high employee turnover or use decentralized workforces, by providing automated knowledge preservation and access. Enterprise knowledge is available when the user needs it and is virtually always relevant. All types of data are available in context, rapidly. Consequently, embodiments offer the potential to bridge the gap between knowledge management and communication.

Embodiments are useful in several different cases. In the first scenario, assume the writer is trying to write an email to close a deal. The techniques of the present disclosure with a knowledge hub can suggest ways to improve it by adding context on a potentially unfamiliar term by suggesting adding a link to a demo with a short explanation of what it is, or by adding a data point supporting a claim to not sound spammy. In a second scenario, a customer could have a question that requires a representative to determine the answer and write a response.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques according to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
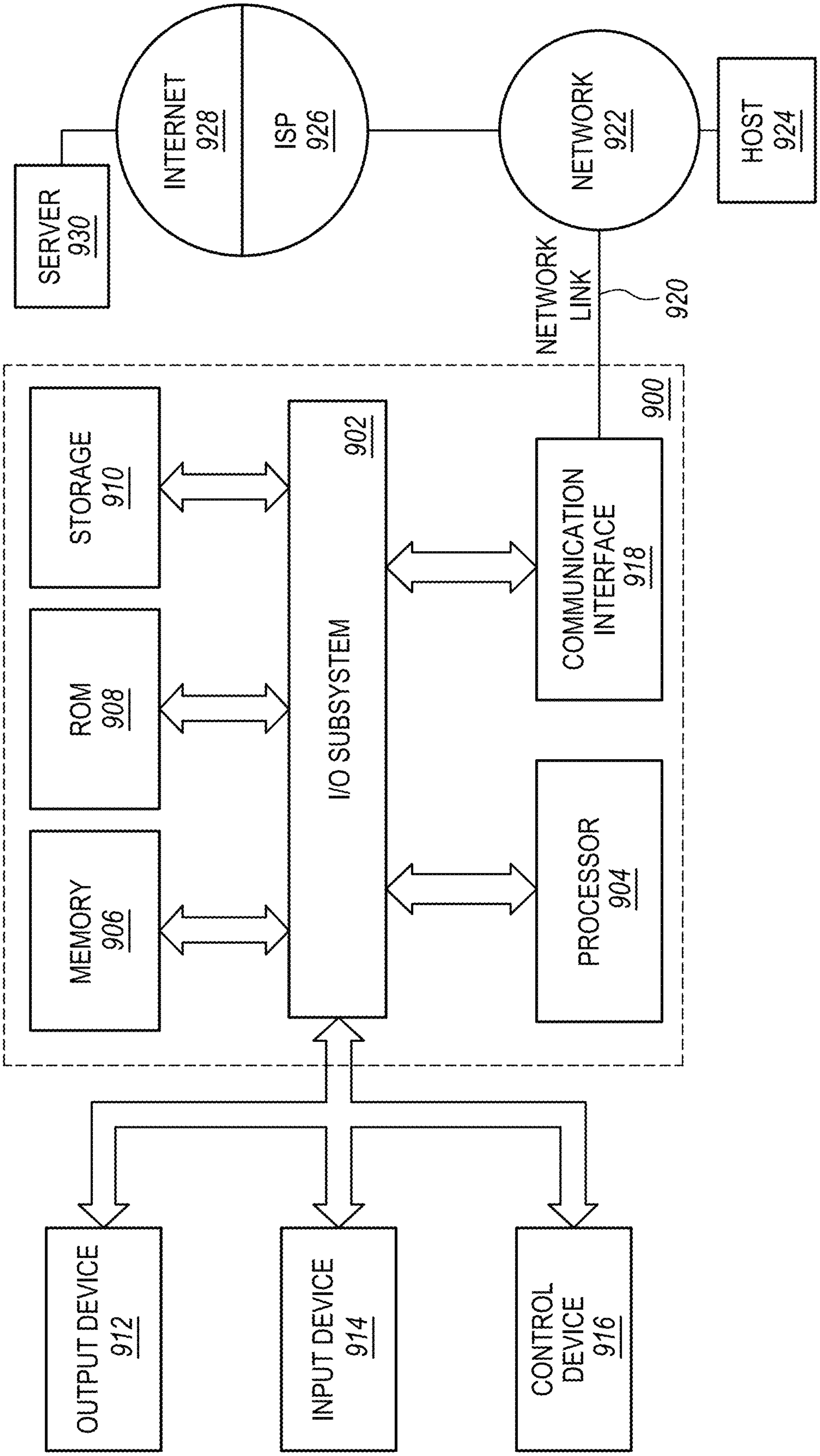
FIG. 9 illustrates a computer system with which one embodiment could be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller, and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU), or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage devices. Memory 906 also may be used for storing temporary variables or other intermediate information during the execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read-only memory (ROM) 908 or other static storage devices coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, solid-state storage, magnetic disk or optical disks such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908, or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 900 may be coupled via I/O subsystem 902 to at least one output device 912. In one embodiment, output device 912 is a digital computer display. Examples of a display that may be used in various embodiments include a touchscreen display or a light-emitting diode (LED) display or a liquid crystal display (LCD) or an e-paper display. Computer system 900 may include other types of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections, or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. The control device 916 may be a touchpad, a mouse, a trackball, or cursor direction keys for communicating direction information and command selections to processor 904 and for controlling cursor movement on output device 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other types of control devices. An input device 914 may include a combination of multiple different input devices, such as a video camera and a depth sensor.

In another embodiment, computer system 900 may comprise an Internet of Things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders, and the output device 912 may comprise a special-purpose display such as a single-line LED or LCD, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 902. Transmission media can also take the form of acoustic or light waves, such as those generated during radio-wave and infrared data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to I/O subsystem 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 922 broadly represents a local area network (LAN), wide-area network (WAN), campus network, internetwork, or any combination thereof. Communication interface 918 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a worldwide packet data communication network represented as Internet 928. A server computer 930 may be coupled to Internet 928. Server 930 broadly represents any computer, data center, virtual machine, or virtual computing instance with or without a hypervisor or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, a server farm, or other organizations of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer, and data storage layer such as a relational database system using a structured query language (SQL) or no SQL, an object store, a graph database, a flat file system or other data storage.

Computer system 900 can send messages and receive data and instructions, including program code, through the network(s), network link 920, and communication interface 918. In the Internet example, server 930 might transmit a requested code for an application program through Internet 928, ISP 926, local network 922, and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described regarding numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a text processor that executes a programmed knowledge suggestion check that is programmatically coupled to a generative artificial intelligence model having a programmatically accessible similarity function, the computer-implemented method comprising:

receiving at the text processor, from a client computing device executing a browser and a text processing extension that extends functions of the browser, a text input from a computing device, wherein the text input comprises a plurality of words of a web page rendered by the browser;

distributing sentences of the text input to a first check, a second check, and a third check that execute in parallel, the first check being configured to check grammar, the second check being configured to detect a tone, and the third check being configured to detect at least one of entities, acronyms, or keywords;

accessing a data store of common knowledge;

generating, using the generative artificial intelligence model, contextual features in a query associated with the text input, wherein the contextual features include a definition for a detected at least one of the entities, acronyms, or keywords;

the generative artificial intelligence model having been trained to generate the contextual features in the query based on the common knowledge;

generating, using the generative artificial intelligence model, a text output using the contextual features in the query associated with the text input; and sending, to the client computing device, instructions for presenting the text output in the browser in a graphical user interface panel near the plurality of words of the web page.

2. The method of claim 1 further comprising:

selecting a brand tone setting from a plurality of tone profiles in the data store; and adjusting a tone of the text output based on the brand tone setting that was selected.

3. The method of claim 1 further comprising:

detecting a document type based on a document; and generating one or more templates based on the detected document type and the document.

4. The method of claim 1 further comprising:

pooling prompt usage limits for team members; and allowing the team members to share the prompt usage limits.

5. The method of claim 4 further comprising granting permission to the computing device to use the generative artificial intelligence model based on one or more metrics associated with at least one of urgency, priority, time, or complexity.

6. A computer system comprising:

one or more processors; and one or more non-transitory computer-readable storage media coupled to the one or more processors and storing instructions, execution of which by the one or more processors, causes the computer system to execute:

receiving, from a client computing device executing a browser and a text processing extension that extends functions of the browser, a text input from a computing device, wherein the text input comprises a plurality of words of a web page rendered by the browser;

distributing sentences of the text input to a first check, a second check, and a third check that execute in parallel, the first check being configured to check grammar, the second check being configured to detect a tone, and the third check being configured to detect at least one of entities, acronyms, or keywords;

accessing a data store of common knowledge;

generating, using a generative artificial intelligence model, contextual features in a query associated with the text input, wherein the contextual features include a definition for a detected at least one of the entities, acronyms, or keywords;

the generative artificial intelligence model having been trained to generate the contextual features in the query based on the common knowledge;

generating, using the generative artificial intelligence model, a text output using the contextual features in the query associated with the text input; and sending, to the client computing device, instructions for presenting the text output in the browser in a graphical user interface panel near the plurality of words of the web page.

7. The computer system of claim 6, wherein the instructions further comprise instructions, execution of which by the one or more processors, causes the computer system to execute:

selecting a brand tone setting from a plurality of tone profiles in the data store; and adjusting a tone of the text output based on the brand tone setting that was selected.

8. The computer system of claim 6, wherein the instructions further comprise instructions, execution of which by the one or more processors, causes the computer system to execute:

detecting a document type based on a document; and generating one or more templates based on the detected document type and the document.

9. The computer system of claim 6, wherein the instructions further comprise instructions, execution of which by the one or more processors, causes the computer system to execute:

pooling prompt usage limits for team members; and allowing the team members to share the prompt usage limits.

10. The computer system of claim 9, wherein the instructions further comprise instructions, execution of which by the one or more processors, causes the computer system to execute:

granting permission to the computing device to use the generative artificial intelligence model based on one or more metrics associated with at least one of urgency, priority, time, or complexity.

11. One or more computer-readable non-transitory storage media embodying software that, when executed in a processing system, causes the processing system to:

receive, from a client computing device executing a browser and a text processing extension that extends functions of the browser, a text input from a computing device, wherein the text input comprises a plurality of words of a web page rendered by the browser;

distribute sentences of the text input to a first check, a second check, and a third check that execute in parallel, the first check being configured to check grammar, the second check being configured to detect a tone, and the third check being configured to detect at least one of entities, acronyms, or keywords;

access a data store of common knowledge;

generate, using a generative artificial intelligence model, contextual features in a query associated with the text input, wherein the contextual features include a definition for a detected at least one of the entities, acronyms, or keywords;

the generative artificial intelligence model having been trained to generate the contextual features in the query based on the common knowledge;

generate, using the generative artificial intelligence model, a text output using the contextual features in the query associated with the text input; and send, to the client computing device, instructions for presenting the text output in the browser in a graphical user interface panel near the plurality of words of the web page.

12. The one or more computer-readable non-transitory storage media of claim 11, the software comprising instructions, execution of which in the processing system causes the processing system to:

select a brand tone setting from a plurality of tone profiles in the data store; and adjust a tone of the text output based on the brand tone setting that was selected.

13. The one or more computer-readable non-transitory storage media of claim 11, the software comprising instructions, execution of which in the processing system causes the processing system to:

detect a document type based on a document; and generate one or more templates based on the detected document type and the document.

14. The one or more computer-readable non-transitory storage media of claim 11, the software comprising instructions, execution of which in the processing system causes the processing system to:

pool prompt usage limits for team members; and allow the team members to share the prompt usage limits.

15. The one or more computer-readable non-transitory storage media of claim 14, the software comprising instructions, execution of which in the processing system causes the processing system to:

grant permission to the computing device to use the generative artificial intelligence model based on one or more metrics associated with at least one of urgency, priority, time, or complexity.

* * * * *